US012552608B1

(12) United States Patent
Hogan

(10) Patent No.: US 12,552,608 B1
(45) Date of Patent: Feb. 17, 2026

(54) COUNTER BALANCING FOR IMPROVED ROBOTIC SYSTEM EFFICIENCY

(71) Applicant: Amazon Technologies, Inc., Seattle, WA (US)

(72) Inventor: Scott Hogan, Mukilteo, WA (US)

(73) Assignee: Amazon Technologies, Inc., Seattle, WA (US)

( * ) Notice: Subject to any disclaimer, the term of this patent is extended or adjusted under 35 U.S.C. 154(b) by 696 days.

(21) Appl. No.: 18/062,159

(22) Filed: Dec. 6, 2022

(51) Int. Cl.
*B65G 1/137* (2006.01)

(52) U.S. Cl.
CPC .................................. *B65G 1/1375* (2013.01)

(58) Field of Classification Search
CPC ..................................................... B65G 1/1375
See application file for complete search history.

(56) References Cited

U.S. PATENT DOCUMENTS

| 7,765,776 B1* | 8/2010 | Leu ........................... B67B 3/00 53/411 |
| 10,613,533 B1* | 4/2020 | Payson ................ G05D 1/0088 |
| 2024/0308767 A1* | 9/2024 | Li ........................ B65G 1/0407 |

* cited by examiner

Primary Examiner — Kyle O Logan
(74) Attorney, Agent, or Firm — Eversheds Sutherland (US) LLP

(57) ABSTRACT

Systems and methods are disclosed for counter balancing for improved robotic system efficiency. In one embodiment, an example container handling system may include a laterally movable frame moveable in a lateral direction, an upright frame supported by the laterally movable frame, and a header movably coupled to the upright frame and configured to move in a vertical direction, where the header includes an extractor, and a support assembly configured to open and close, where the support assembly is configured to receive an item from the extractor. The system may include a pulley assembly configured to drive vertical movement of the header, and a counter balance coupled to the pulley assembly, where the counter balance provides a force to counter gravitational force exerted on the header.

20 Claims, 14 Drawing Sheets

COUNTER BALANCING FOR IMPROVED ROBOTIC SYSTEM EFFICIENCY

BACKGROUND

As users increasingly make online purchases, fulfilment of such purchases and other orders may become increasingly complicated. For example, a fulfillment center may have output of upwards of one million packages per day. With such demands, efficiency of logistics related to processing orders and packages may be important. Accordingly, improvements in various operations of order fulfillment, such as improvements to picking technology, sorting technology, packing technology, and so forth may be desired, such that throughput can be increased and sustainability can be improved.

Figure 1:
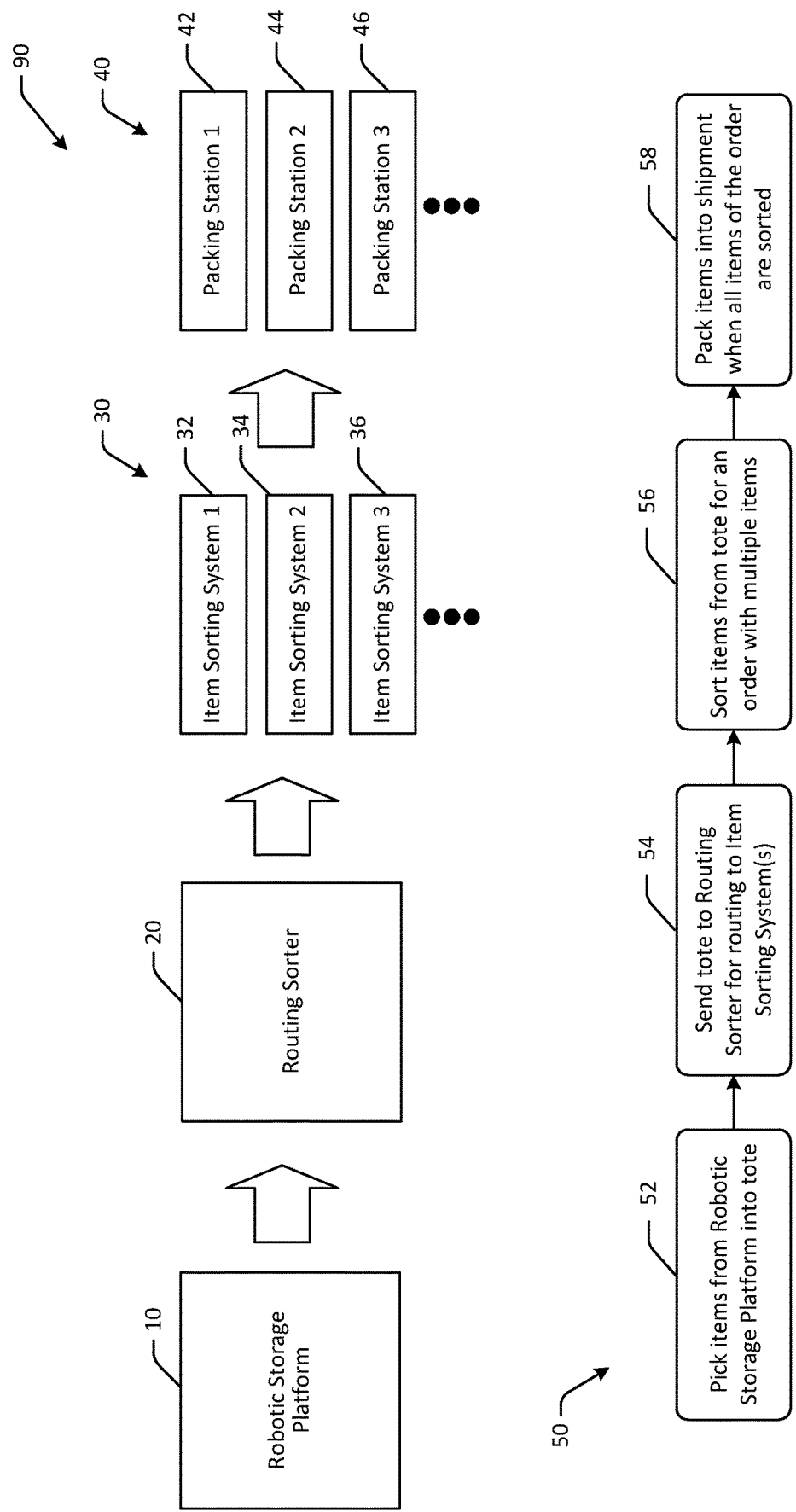
FIG. 1 is a hybrid schematic illustration of an example inventory system having a counter balancing for improved robotic system efficiency and an example process flow in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products and/or shipping of packages in an order may be time consuming.

In some instances, orders for products may include multiple items. For example, a user may place an order for two or more products. In such instances, the products that are ordered may not be in the same location of the fulfillment center, or one of the products may take a longer time to obtain or pick than the others. As a result, packing of the order may be delayed until all of the items in the order are ready for packing. To improve the speed of processing orders, in certain instances, robots and other technology may be deployed, such that manual efforts can be redirected to other tasks. For example, robots may be used to assist with locating products in an order during a pick process. However, directing picked products to the appropriate packing station and/or location may form a bottleneck in the operation of the fulfillment center. For example, after products are picked, the products may be placed in a container, such as a tote or other container, and directed to sortation machines to direct the picked products to the appropriate packing location. For example, products in the same order may be directed to the same packing location for consolidation and subsequent packing. However, a tote or other container may include products that are to be sorted to multiple different packing locations, and the sortation process may be slowed by sheer volume of products that are to be processed and/or sorted. In addition, in some instances, items that are part of the same order may not all be in the same fulfillment center or other location. For example, a first product in an order of two items may be at a first fulfillment center, and a second product in the same order may be at a second fulfillment center. In such instances, instead of shipping the two items in the order separately, such as one from each fulfillment center, items may be transferred from one fulfillment center to another, and then aggregated with other items in the order and shipped together. Such fulfillment center-to-fulfillment center transfers of items may be processed similar to items that are to be shipped to consumers. For example, the items to be transferred may be picked, routed to a sortation machine, sorted into a particular container (e.g., a container designated for a particular fulfillment center, etc.), packed, and sent. In some instances, containers destined for other fulfillment centers may be infinite bottom containers, or containers that may be filled without consideration of a level of fullness or remaining capacity of the container. In such instances, capacity of the containers may be monitored externally (e.g., by a user manually, by a camera system automatically, using different sensors, etc.). Full containers may be removed from a sortation system and replaced with an empty container to continue aggregating items destined for a fulfillment center.

As items are placed into containers for storage (e.g., inventory hold, etc.), transport, sortation, etc., the containers may be placed in pods or other structures configured to hold a plurality of containers. For example, a container pod may be configured to store one or more containers, such as totes, bags, and other containers, in one or more columns and/or rows. Container pods may include slots to store different containers. Some or all of the container slots in a container pod may be filled or unfilled. Container pods may serve as temporary storage location for containers. Containers may be filled or unfilled, such as filled with items in inventory. Container pods may also be flexible in that the container pods may be transported to or from various locations in a fulfillment center. Accordingly, the container pod location may be flexible. Container pods may be transported by lifting the container pod off the ground and transporting the container pod. In some instances, autonomous robots may lift the container pod and transport the container pod, including the containers stored at the container pod, from a first location to a second location.

Handling of containers, such as during loading and/or unloading from container pods, may be performed using robotic manipulators, such as gantries, robotic arms, and so forth. At highly scaled operations, handling of such containers may be negatively impacted by gravity. For example, counteracting gravity when moving containers vertically may cause wear and tear on robotic components.

Embodiments of the disclosure reduce wear and tear of components, and improve robotic system longevity and efficiency, by providing a counterbalancing system that negates the impact of gravity. In one embodiment, a counter balance system may include a cylinder and piston with vacuum against atmospheric pressure to create force to counteract gravitational forces. Such embodiments may also enable smaller drive train components and lower cost. In contrast to pressurized cylinders, embodiments may not include piston rods or piston rod seals. Certain embodiments may have inherently low pressure on the cylinder, allowing for a thin wall, and resulting in low material cost. Embodiments may be constant force without the need for accumulators. In certain embodiments, lubrication will not leak as the pressure delta is inward. Some embodiments may result in a six-fold decrease in peak power usage, which translates to savings in drive train components. Embodiments may therefore increase throughput and speed of consolidating items for multi-item orders and/or consolidating packages that are destined for certain related destinations, such as other fulfillment centers. Some embodiments include optimized process flows for processing of orders at fulfillment centers, as well as process flows or equipment to increase speed of consolidating products in a multi-item order and/or speed of sorting packages. As a result, throughput of fulfillment centers may be improved, and/or logistics of fulfillment center operations may be less complicated.

Referring to FIG. 1, an example use case 90 for counter balancing for improved robotic system efficiency in an example inventory system and an example process flow in accordance with one or more embodiments of the disclosure. Although discussed in the context of online orders, other embodiments may be directed to any suitable use case where products are picked and sorted, or packages are sorted, such as instances where users may pick up orders rather than receiving a shipment, instances where items are aggregated for transport to another fulfillment center, and so forth.

In FIG. 1, a fulfillment center may include a robotic storage platform 10, a routing sorter 20, one or more item sorting systems 30, and one or more packing stations 40. The robotic storage platform 10 may be a portion of the fulfillment center at which products picked from product inventory are placed. Inventory may be stored in containers in flexible container pods in some instances. Robots may be used to pick products from inventory and to deliver to the robotic storage platform in some instances, while in other instances, manual effort or a combination thereof may be used to pick products. The picking process at the robotic storage platform may include locating a product in an order, obtaining the product, and sending the product to the robotic storage platform 10, such as via a conveyor belt. In the illustrated embodiment, products at the robotic storage platform 10 may be placed in a container, such as a tote. The tote may be assigned to, or otherwise associated with, a particular item sorting system machine in some instances. For example, a certain tote may be associated with a certain item sorting system, such that products that are designated to be picked and placed in the tote are for orders that are to be consolidated at that particular item sorting system. The association between the tote and the item sorting system may be static in some instances. In other embodiments, there may not be any association between totes and item sorting systems, or associations may be dynamic.

At the routing sorter 20, totes including products that have been picked may be routed to the appropriate or designated item sorting system. For example, the routing sorter 20 may optionally determine an identifier associated with the tote, and may determine one or more item sorting systems to which the tote is to be routed using the identifier or using another factor, such as sortation system load. The routing sorter 20 may route or direct the tote to an item sorting system.

The item sorting systems 30 may include one or more item sorting system machines. In FIG. 1, a first item sorting system 32, a second item sorting system 34, a third item sorting system 36, and so forth may be included. Any number of item sorting systems may be included. Some or all of the item sorting systems may optionally be associated with certain totes. The item sorting systems may be used to consolidate or otherwise aggregate products for single or multi-item orders and/or for transfer to a different fulfillment center. For example, a first tote may include a first item of a multi-item order, and a second tote may include a second item of the multi-item order. The item sorting system may therefore identify the orders associated with the respective products in a tote, and may transport the products to a container, such as a tote, a flexible container, a specific chute leading to a container, or a different container associated with the order. When the order is complete with all of the products in the associated chute or container, the order may be packed. In instances where a container is designated for a different fulfillment center, as opposed to an online order, the container may be packed when full, as opposed to when certain items are placed into the container (e.g., there may not be any specific items that need to be in the container before packing, rather, the container may just be a certain threshold full, etc.). Accordingly, a specific item sorting system may be designated for fulfillment of a particular multi-item order. As a result, all of the products in the multi-item order may be placed in totes that are directed to that particular item sorting system. At the item sorting systems 30, totes that are received via the routing sorter 20 may be emptied, and the products in the respective totes may be transported to the appropriate chutes or containers for the orders for which the products were picked.

After a single or multi-item order is complete (e.g., the item sorting system has delivered all of the products in the order to the appropriate chute, container, etc.), or when a container designated for another fulfillment center is full (where full is a configurable threshold, such as about 60% full capacity, 70% full capacity, 80% full capacity, 90% full capacity, etc.), the order may be packed at the packing station 40. In some embodiments, one or more packing stations may be included. In some instances, a packing station may service more than one item sorting system, while in other instances, more than one packing station may service one item sorting system. In the illustration of FIG. 1, a first packing station 42 may be used to pack orders from the first item sorting system 32, a second packing station 44 may be used to pack orders from the second item sorting system 34, a third packing station 46 may be used to pack orders from the third item sorting system 36, and so forth. At the packing stations 40, the orders may be placed into boxes and sealed for subsequent shipment. The packages may then be processed for shipment to the user. In another example, the containers may be stacked, closed, or otherwise packed for shipment to another fulfillment center.

At the fulfillment center, an example process flow 50 illustrated in FIG. 1 may be implemented to improve the efficiency and/or throughput of the fulfillment center. At a first block 52, items may be picked from the robotic storage platform 10 into a tote that may optionally be associated with a specific item sorting system. At a second block 54, the tote may be sent to the routing sorter 20 for routing to an item sorting system. At a third block 56, the items from the tote may be sorted for an order with multiple item by the specific item sorting system. At a fourth block 58, the items may be packed into a shipment when all of the items in the order are sorted.

Embodiments of the disclosure include counter balancing for improved robotic system efficiency. Certain embodiments may improve processing speed and/or throughput of fulfillment centers. Certain embodiments may improve performance of mechanical equipment for sortation and/or consolidation of items for multi-item orders via increased tolerances. While described in the context of online orders, aspects of this disclosure are more broadly applicable to other forms of product sortation.

Example embodiments of the disclosure provide a number of technical features or technical effects. For example, in accordance with example embodiments of the disclosure, certain embodiments of the disclosure may improve processing speed, throughput, and/or efficiency of fulfillment centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 2A:
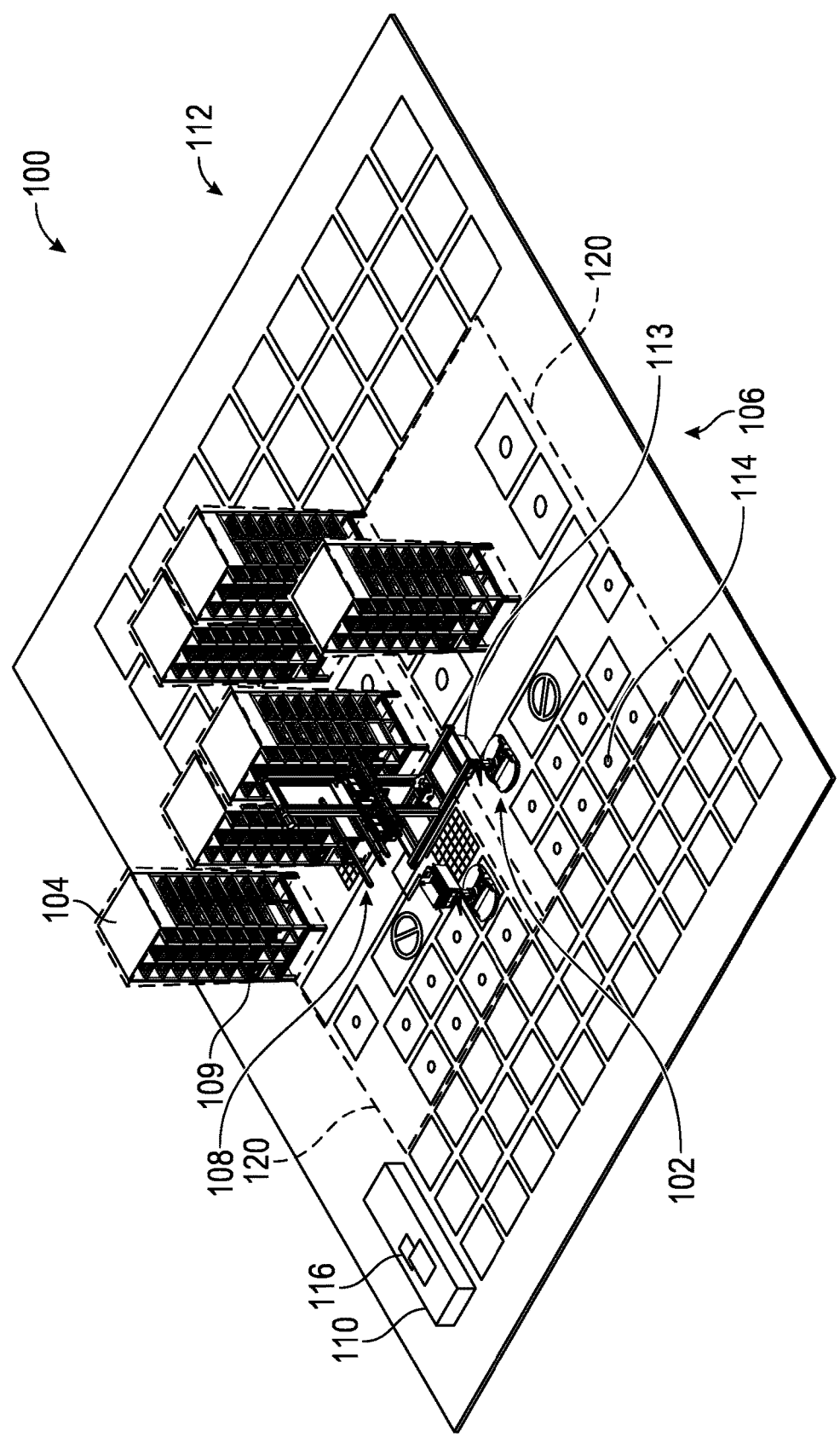
FIGS. 2A-2B are schematic illustrations of an example inventory system and an example management module that can be used in the inventory system in accordance with one or more embodiments of the disclosure.
Figure 2B:
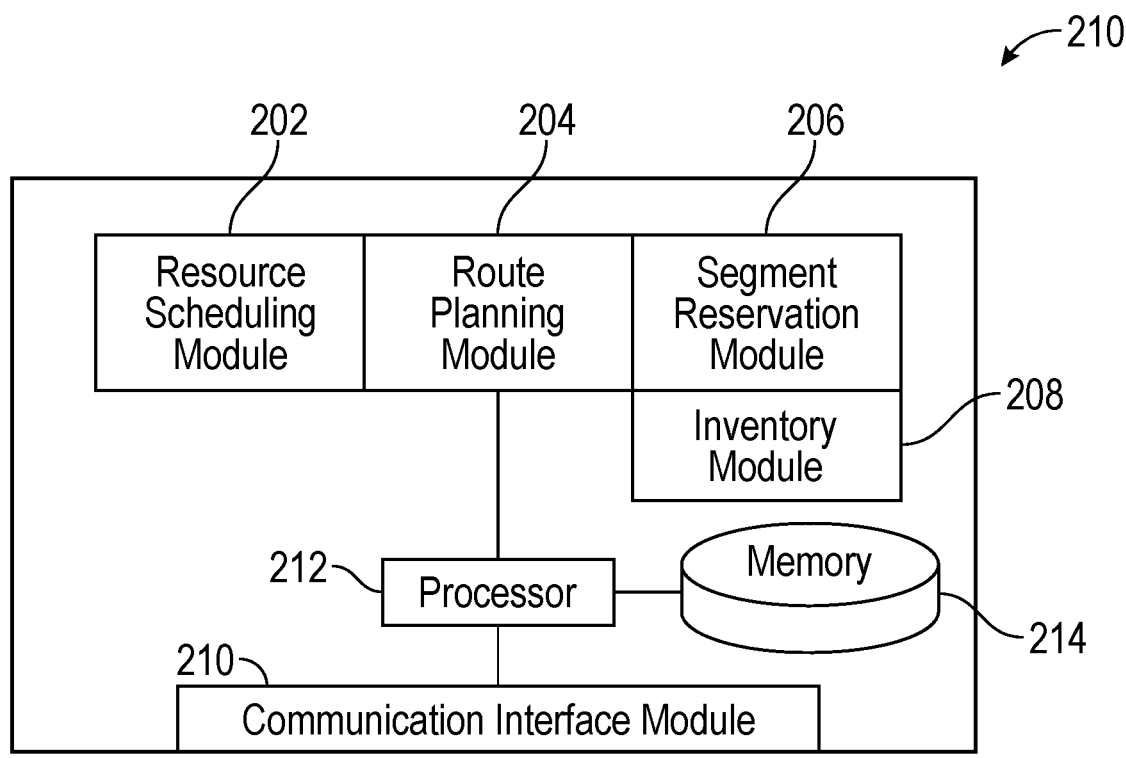

FIGS. 2A-2B are schematic illustrations of an example inventory system and an example management module that can be used in the inventory system in accordance with one or more embodiments of the disclosure. Other embodiments may include additional or fewer components. The illustration of FIGS. 2A-2B are not to scale, and may not be illustrated to scale with respect to other figures. The inventory system discussed with respect to FIGS. 2A-2B may be the same systems discussed with respect to FIG. 1.

In some embodiments, inventory holders can include shelves and/or compartments for receiving items or containers with items therein. The inventory holders and/or other system components may be moved by mobile drive units (e.g., a fleet of mobile drive units) that can move around a warehouse environment, for example. Items may be transported (e.g., within inventory holders, containers, etc.) to stations. For example, at stations, the items may be consolidated into groups to fulfill customer orders and/or otherwise be processed for subsequent operations.

In various embodiments, the inventory system may include areas organized into queues to facilitate processing. For example, queues may be arranged to allow items to be accessed from inventory holders in one part of the queue and transferred to mobile drive units or other carriers in another part of the queue. The respective portions of the queue may be accessible by a robotic assembly or other transfer apparatus to effectuate the transfer of items from one portion of the queue to another. In various embodiments, the transfer apparatus may be movable between two different queues. For example, the transfer apparatus may perform an item swapping task in one queue while inventory holders and carriers are cycled within another queue. The cycling may arrange elements in a suitable position for subsequent swapping activity by the transfer apparatus. As a result of the transfer apparatus being able to work in one queue while the other queue is being prepared for additional swapping activity, inactive time and/or down time for the transfer apparatus may be reduced and lead to increased throughput of the inventory system, for example.

As an illustrative example, the transfer apparatus may include a laterally movable frame moveable in a lateral direction, an upright frame supported by the laterally movable frame, and a header movably coupled to the upright frame to move in a vertical direction. Respective parts of the transfer apparatus can move to align the header with a tote or other item within an inventory holder. The header can include a suction cup or other extractor that can be actuated to extract the item from an inventory holder. The extractor can pull the item over a claw assembly that may also be part of the header. The extractor may position the item over the claw assembly in a closed state of the claw assembly. The header can be moved to a position directly over a mobile drive unit or other carrier, and the claw assembly can be opened to deposit the item onto the carrier. The header can also be utilized for pick up purposes. For example, another carrier may bring a second item into a pick-up location at which the claw can close below the underside of the second item. With the claw supporting the second item, the extractor can push the second item from along the top side of the claw and along the header to move the second item into the inventory holder (such as into the space previously vacated by the first extracted item).

Advantageously, the transfer apparatus can facilitate a fast pick up and a direct drop off from a bottom open portion of the header through use of the claw assembly. For example, the direct drop off may facilitate faster item transfer within a queue. The transfer apparatus can be employed to move back-and-forth between queues to improve an item transfer time. For example, the transfer apparatus can advantageously allow item transfer within the first queue and simultaneous cycle inventory holders and carriers in the second queue so that the transfer apparatus can quickly translate to the second queue to quickly transfer a second item in the second queue. This way, a total item transfer time can be substantially improved in an inventory system. The transfer time can be further improved by using a two-header configuration of the transfer item to facilitate simultaneously pick and drop off items at the same time.

FIG. 2A illustrates a perspective view of an example of an inventory system 100, according to embodiments. The inventory system 100 can move inventory items between locations within a warehouse (e.g., workspace 112). For example, the inventory system 100 can facilitate the entry, processing, and/or removal of inventory items from the inventory system 100 and the completion of other tasks involving the inventory items. The inventory system 100 can include one or more mobile drive units 102 (e.g., a fleet of mobile drive units 102) (also referred to as autonomous vehicles, autonomous surface vehicles, autonomous robotic vehicles, mobile drive units, unmanned aerial vehicles, etc.), one or more inventory holders 104, one or more inventory stations 106, one or more transfer apparatuses 108, and/or a management module 110. The components of the inventory system 100 may operate within a workspace 112. The inventory holders 104 and/or other components of the system 100 may be moved among locations within the workspace 112 by mobile drive units 102 or may include other forms of suitable propulsion systems. In some embodiments, mobile drive units 102 may include or be carriers 113 capable of carrying containers or other items individually or in groups within the workspace 112. In some embodiments, carriers 113 may be transported and/or correspond to portions of other structures, such as conveyors or other components capable of transporting.

The mobile drive units 102 (e.g., each drive unit) can transport the inventory holders 104 between locations within a workspace 112. For example, each mobile drive unit 102 can transport one or more inventory holders 104. The mobile drive units 102 can transport the inventory holders 104 in response to commands communicated by the management module 110. The inventory holders 104 can be carried, rolled, and/or otherwise moved by the mobile drive units 102.

In various embodiments, the inventory holders 104 can store inventory items of the inventory system 100. For example, the inventory holders 104 can include multiple storage bins with each storage bin capable of holding one or more types of inventory items. The inventory holders 104 can include one or more spaces (e.g., cubbies, shelves, slots, etc.) that can receive one or more types of inventory items. The inventory holders 104 may include items within totes, boxes, bags, or other forms of containers 109.

The inventory items represent any objects suitable for storage, retrieval, and/or processing in the inventory system 100. For example, inventory items can be or include one or more objects of a particular type that are stored in the inventory system 100. In further embodiments, a particular inventory holder 104 can store a particular inventory item if the inventory holder 104 currently holds one or more of the same item type.

Turning to a particular example, the inventory system 100 can represent a mail-order or other order-fulfillment warehouse facility, and inventory items can represent merchandise stored in the warehouse facility. During operation, the mobile drive units 102 can carry an inventory holder 104 containing one or more inventory items that are requested in an order to be packed for delivery to a customer. Alternatively or additionally, the inventory holder 104 may contain aggregated collections of inventory items for shipment. Moreover, in particular embodiments of the inventory system 100, boxes containing completed orders may themselves represent inventory items.

The mobile drive units 102 can be or include any suitable devices and/or components appropriate for use in the inventory system 100. For example, the mobile drive units 102 can include components based on the characteristics and configuration of the inventory holders 104 and/or other elements of the inventory system 100. In some embodiments of the inventory system 100, the mobile drive units 102 can be or include autonomous robotic vehicles that can move about the workspace 112. One or more of the mobile drive units 102 can be equipped with sensors (e.g., a stereo camera), which may enable the drive unit(s) to detect obstacles (e.g., items or objects) and alert human operators to the location of the obstacles, so that the obstacles can be removed.

Figure 5:
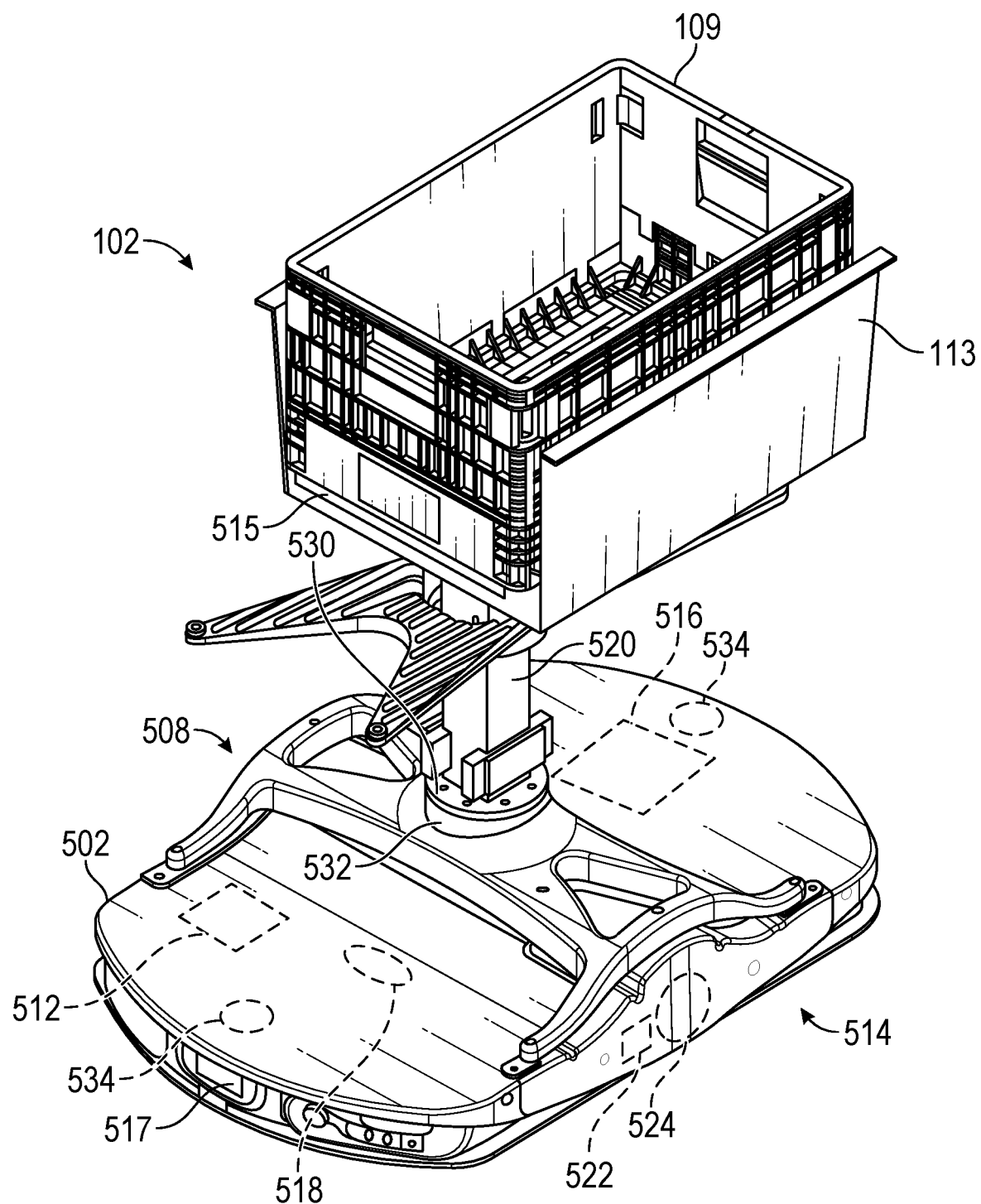
FIG. 5 is a schematic illustration of examples of components relative to an example of a mobile drive unit in accordance with one or more embodiments of the disclosure.

In various embodiments, (e.g., as shown in FIG. 5) the mobile drive units 102 can include one or more sensors 518. The sensors 518 can detect various objects in the workspace 112. For example, the sensors 518 can detect inventory items, inventory holders 104, transfer apparatuses 108, other mobile drive units 102, inventory stations 106, and/or individuals in the workspace 112. The sensors 518 can be or include a camera, Lidar, a color sensor, a cliff sensor radar, a proximity sensor, an impact sensor, a magnetic sensor, an electrical sensor, a color sensor, a cliff sensor, an electromagnetic sensor (e.g., to detect electromagnetic field intensity and/or orientation), a brightness sensor, a spectrometer, a photometer, and/or any suitable sensors for detecting objects in the workspace 112.

In various embodiments, one or more fiducials 114 (e.g., fixed navigation anchors) can be positioned in the workspace 112 (e.g., on the floor, ceiling, and/or wall of the workspace 112). The fiducials 114 can be used for navigation (e.g., provide navigational references and/or directions to the mobile drive units 102). The fiducials 114 can additionally or alternatively be used to demarcate different regions (e.g., different functional regions within the workspace 112). In further embodiments, the fiducials 114 can include a calibration fiducial positioned in a calibration region and used to identify a calibration position (e.g., a position that is a known distance and/or angular position relative to a calibration fixture to provide readings that can facilitate calibration of the mobile drive units 102). The fiducials 114 can be or include stickers, markers, markings, and/or physical objects (e.g., an alignment pin).

In various embodiments, the mobile drive units 102 can operate without human intervention in a structured area (e.g., using the fiducials 114). For examples, the fiducials 114 can be detected by sensors on the mobile drive units 102 to aid in the navigation of the mobile drive units 102 around the workspace 112.

In further embodiments, the mobile drive units 102 can additionally or alternatively operate without human intervention in an unstructured area (or field) that does not contain fiducials. For example, the mobile drive units 102 can be equipped with autonomous navigation functions and/or sensors 518 that enable the mobile drive unit 102 to maneuver within the workspace 112 without the use of fiducials.

The workspace 112 can represent an area associated with the inventory system 100. For example, the workspace 112 can be a place in which the mobile drive units 102 can move and/or in which the inventory holders 104 can be stored. In various embodiments, the workspace 112 can represent some or all of the floor of a warehouse environment in which the inventory system 100 operates.

Although FIG. 2A shows, for the purposes of illustration, an embodiment of the inventory system 100 in which the workspace 112 includes a fixed, predetermined, and finite physical space, particular embodiments of the inventory system 100 may include mobile drive units 102 and/or inventory holders 104 that are configured to operate within a workspace 112 that is of variable dimensions and/or of an arbitrary geometry. Similarly, while FIG. 2A illustrates a particular embodiment of the inventory system 100 in which the workspace 112 is entirely enclosed in a warehouse environment, alternative embodiments can utilize the workspace 112 in which some or all of the workspace 112 is located, for example, outdoors, within a vehicle (such as a cargo ship), and/or otherwise unconstrained by any fixed structure.

The management module 110 can assign tasks to appropriate components of the inventory system 100 and/or can coordinate operation of the various components of the inventory system 100 in completing the tasks. These tasks can relate to the movement and processing of inventory items and/or to the management and maintenance of the components of the inventory system 100. For example, the management module 110 can assign portions of the workspace 112 for "parking" the mobile drive units 102, for example, for recharging and/or replacing batteries of the mobile drive units 102. The management module 110 can additionally or alternatively assign a portion of the workspace 112 for the storage of empty inventory holders 104 and/or any other operations associated with the functionality supported by the inventory system 100 and its various components.

In various embodiments described herein, the management module 110 can instruct movement and/or operation of inventory holders 104. For example, the management module 110 can instruct the mobile drive units 102 to move inventory holders 104 to suitable locations for interacting with transfer apparatuses 108. The management module 110 may provide instructions for causing actuation of components of the transfer apparatuses 108 suitable for manipulating containers 109 and/or items relative to inventory holders 104. The management module 110 may provide instructions to the transfer apparatus 108 directly or via the mobile drive units 102, for example.

The management module 110 may select components of the inventory system 100 to perform the tasks and communicate appropriate commands and/or data to the selected components to facilitate completion of the various operations. For example, the management module 110 can generate and transmit task assignments 116 to the selected components to trigger completion of the relevant tasks. Each task assignment 116 can include one or more tasks to be completed by a particular component. For example, the tasks can be or include the retrieval, storage, replenishment, and/or the counting of inventory items and/or the management of the mobile drive units 102, the inventory holders 104, the transfer apparatuses 108, and/or components of the inventory system 100. Depending on the component and task to be completed, a particular task assignment 116 can identify locations, components, and/or actions associated with the corresponding task and/or any other appropriate information to be used by the relevant component in completing the assigned task.

Although shown in FIG. 2A as a single, discrete component, the management module 110 can represent multiple components and/or can represent or include portions of the mobile drive units 102 and/or other elements of the inventory system 100. Accordingly, any or all of the functionality of the management module 110 that is described herein may, in particular embodiments, represent functionality of a mobile drive unit 102 (e.g., a controller within the mobile drive unit 102).

In further embodiments, the management module 110 can select a mobile drive unit 102, inventory holder 104, transfer apparatus 108, or other unit of the inventory system 100 to assign the relevant task based on the location or state of the selected unit, an indication that the selected unit has completed a previously-assigned task, a predetermined schedule, and/or any other suitable consideration. These destinations can be associated with an inventory request that the management module 110 is executing and/or a management objective that the management module 110 is attempting to fulfill. For example, the task assignment can define the location of an inventory holder 104 to be accessed, a transfer apparatus 108 to be utilized, an inventory station 106 to be visited, a storage location where the mobile drive unit 102 should park until receiving another task, or a location associated with any other task appropriate based on the configuration, characteristics, and/or state of the inventory system 100, as a whole, or individual components of the inventory system 100.

As part of completing various task assignments 116, the mobile drive units 102 can move the inventory holders 104 and/or other components between locations within the workspace 112. For example, the mobile drive units 102 can couple with and transport the inventory holders 104 within the workspace 112.

The management module 110 can communicate with various components of the inventory system 100. For example, the management module 110 can communicate to receive information identifying selected inventory holders 104, to transmit the locations of the mobile drive units 102, to transmit image data for images of fiducials 114 captured by the mobile drive units 102, and/or to exchange any other suitable information to be used by the management module 110 the mobile drive units 102, and/or other elements of the inventory system 100 during operation. The management module 110 can communicate with the components of the inventory system 100 (e.g., the mobile drive units 102, inventory holders 104, etc.) wirelessly, using wired connections, and/or in any other appropriate manner. Additionally or alternatively, the mobile drive units 102 can communicate with inventory holders 104 and/or other components of the inventory system 100 and/or with one another wirelessly, using wired connections, and/or in any other appropriate manner.

In various embodiments, components of the inventory system 100 can communicate using IEEE 802.11, Bluetooth, or Infrared Data Association (IrDA) standards, or any other appropriate wireless communication protocol. Additionally or alternatively, the inventory system 100 can include tracks or other guidance elements upon which the mobile drive units 102 can be wired to facilitate communication between the mobile drive units 102, between the management module 110 and the mobile drive units 102, and/or between the components of the inventory system 100. In general, the mobile drive units 102 can be powered, propelled, and controlled in any manner appropriate based on the configuration and characteristics of the inventory system 100.

The inventory stations 106 can represent locations designated for the completion of particular tasks involving inventory items. For example, the tasks can include the removal of inventory items from the carriers 113 and/or the inventory holders 104, the introduction of inventory items into the carriers 113 and/or the inventory holders 104, the counting of inventory items in the carriers 113 and/or the inventory holders 104, the decomposition of inventory items (e.g., separating from pallet-sized or case-sized groups into individual inventory items), the consolidation of inventory items between the inventory holders 104 and/or the carriers 113, and/or the processing or handling of inventory items in any other suitable manner.

In some embodiments, one or more inventory stations 106 can represent a location at which the inventory system 100 is externally accessible by human operator(s) and/or robotic system(s) external to the inventory system 100. In some embodiments, the workspace 112 can be externally bounded by walls and/or a fence to prevent or limit access to the workspace 112 by human operator(s) (e.g., a structured environment), and each of the inventory stations 106 is arranged at a respective opening in the walls or fence. In some embodiments, the workspace 112 is not externally bounded (e.g., an unstructured environment). In further embodiments, the inventory system 100 can allow both mobile drive units 102 and human operator(s) to navigate through the workspace 112 and interact with various components of the inventory system 100.

The workspace 112 can include one or more queues 120 in which components of the inventory system 100 may be organized and/or sequenced to facilitate processing operations. Queues 120 may be arranged at stations 106, for example. In various embodiments, multiple queues 120 can be arranged alongside one another. As an example, FIG. 2A shows two queues 120 positioned laterally relative to one another.

In FIG. 2B, a particular embodiment of the management module 110 is shown in greater detail that may be utilized in particular embodiments of the system or architecture shown in FIG. 2A. As shown, the example embodiment includes a resource scheduling module 202, a route planning module 204, a segment reservation module 206, an inventory module 208, a communication interface module 210, a processor 212, and a memory 214. The management module 110 can represent a single component, multiple components located at a central location within inventory system 100, or multiple components distributed throughout inventory system 100. For example, the management module 110 may represent components of one or more mobile drive units 102 that are capable of communicating information between the mobile drive units 102 and coordinating the movement of mobile drive units 102 within workspace 112. In general, management module 110 may include any appropriate combination of hardware and/or software suitable to provide the described functionality.

The processor 212 is operable to execute instructions associated with the functionality provided by management module 110. The processor 212 can comprise one or more computers, dedicated microprocessors, or other processing devices capable of communicating electronic information. Examples of the processor 212 include one or more application-specific integrated circuits (ASICs), field programmable gate arrays (FPGAs), digital signal processors (DSPs) and any other suitable specific purpose processors. The memory 214 can store processor instructions, inventory requests, reservation information, state information for the various components of inventory system 100 and/or any other appropriate values, parameters, or information utilized by management module 110 during operation. The memory 214 can represent any collection and arrangement of volatile or nonvolatile, local or remote devices suitable for storing data. Examples of the memory 214 may include, but are not limited to, random access memory (RAM) devices, read only memory (ROM) devices, magnetic storage devices, optical storage devices or any other suitable data storage devices.

The resource scheduling module 202 can process received inventory requests and generate one or more assigned tasks to be completed by the components of inventory system 100. The resource scheduling module 202 can additionally or alternatively include one or more appropriate components for completing the assigned tasks and, using communication interface module 210, communicate the assigned tasks to the relevant components. Additionally, the resource scheduling module 202 can also be responsible for generating assigned tasks associated with various management operations, such as prompting the mobile drive units 102 to move to a calibration region for calibration of the sensors 518, to recharge the power storage device 216 and/or have power storage device 216 replaced, to instruct inactive mobile drive units 102 to park in a location outside the anticipated traffic flow or a location near the anticipated site of future tasks, and/or to direct the mobile drive units 102 selected for repair or maintenance to move towards a designated maintenance station.

The route planning module 204 receives route requests from mobile drive units 102. These route requests identify one or more destinations associated with a task the requesting mobile drive unit 102 is executing. In response to receiving a route request, the route planning module 204 can generate a path to one or more destinations identified in the route request. The route planning module 204 may implement any appropriate algorithms utilizing any appropriate parameters, factors, and/or considerations to determine the appropriate path. After generating an appropriate path, the route planning module 204 can transmit a route response identifying the generated path to the requesting mobile drive unit 102 using, using for example, the communication interface module 210.

The segment reservation module 206 can receive reservation requests from mobile drive units 102 attempting to move along paths generated by the route planning module 204. These reservation requests request the use of a particular portion of workspace 112 (referred to herein as a "segment") to allow the requesting mobile drive unit 102 to avoid collisions with other mobile drive units 102 while moving across the reserved segment. In response to received reservation requests, the segment reservation module 206 can transmit a reservation response granting or denying the reservation request to the requesting mobile drive unit 102 using the communication interface module 210.

The inventory module 208 can maintain information about the location and number of items in the inventory system 100. Information can be maintained about the number of items in a particular inventory holder 104 and/or inventory holder 104 and the maintained information can include the location of those items in the inventory holder 104 and/or inventory holder 104. The inventory module 208 can also communicate with the mobile drive units 102, utilizing task assignments 116 to maintain, replenish or move items within the inventory system 100.

The communication interface module 210 can facilitate communication between management module 110 and other components of inventory system 100, including reservation responses, reservation requests, route requests, route responses, and task assignments. These reservation responses, reservation requests, route requests, route responses, and task assignments may represent communication of any form appropriate based on the capabilities of management module 110 and may include any suitable information. Depending on the configuration of management module 110, the communication interface module 210 can be responsible for facilitating either or both of wired and wireless communication between the management module 110 and the various components of inventory system 100. In particular embodiments, the management module 110 can communicate using communication protocols such as 802.11, Bluetooth, or Infrared Data Association (IrDA) standards. Furthermore, the management module 110 can, in particular embodiments, represent a portion of mobile drive unit 102 or other components of inventory system 100. In such embodiments, the communication interface module 210 can facilitate communication between management module 110 and other parts of the same system component.

In general, the resource scheduling module 202, the route planning module 204, the segment reservation module 206, the inventory module 208, and the communication interface module 210 can each represent any appropriate hardware and/or software suitable to provide the described functionality. In addition, as noted above, the management module 110 may, in particular embodiments, represent multiple different discrete components and any or all of the resource scheduling module 202, the route planning module 204, the segment reservation module 206, the inventory module 208, and the communication interface module 210 can represent components physically separate from the remaining elements of management module 110. Moreover, any two or more of the resource scheduling module 202, the route planning module 204, the segment reservation module 206, the inventory module 208, and the communication interface module 210 can share common components. For example, in particular embodiments, the resource scheduling module 202, the route planning module 204, the segment reservation module 206, and the inventory module 208 can represent computer processes executing on the processor 212 and the communication interface module 210 comprises a wireless transmitter, a wireless receiver, and/or a related computer process executing on the processor 212.

Figure 3:
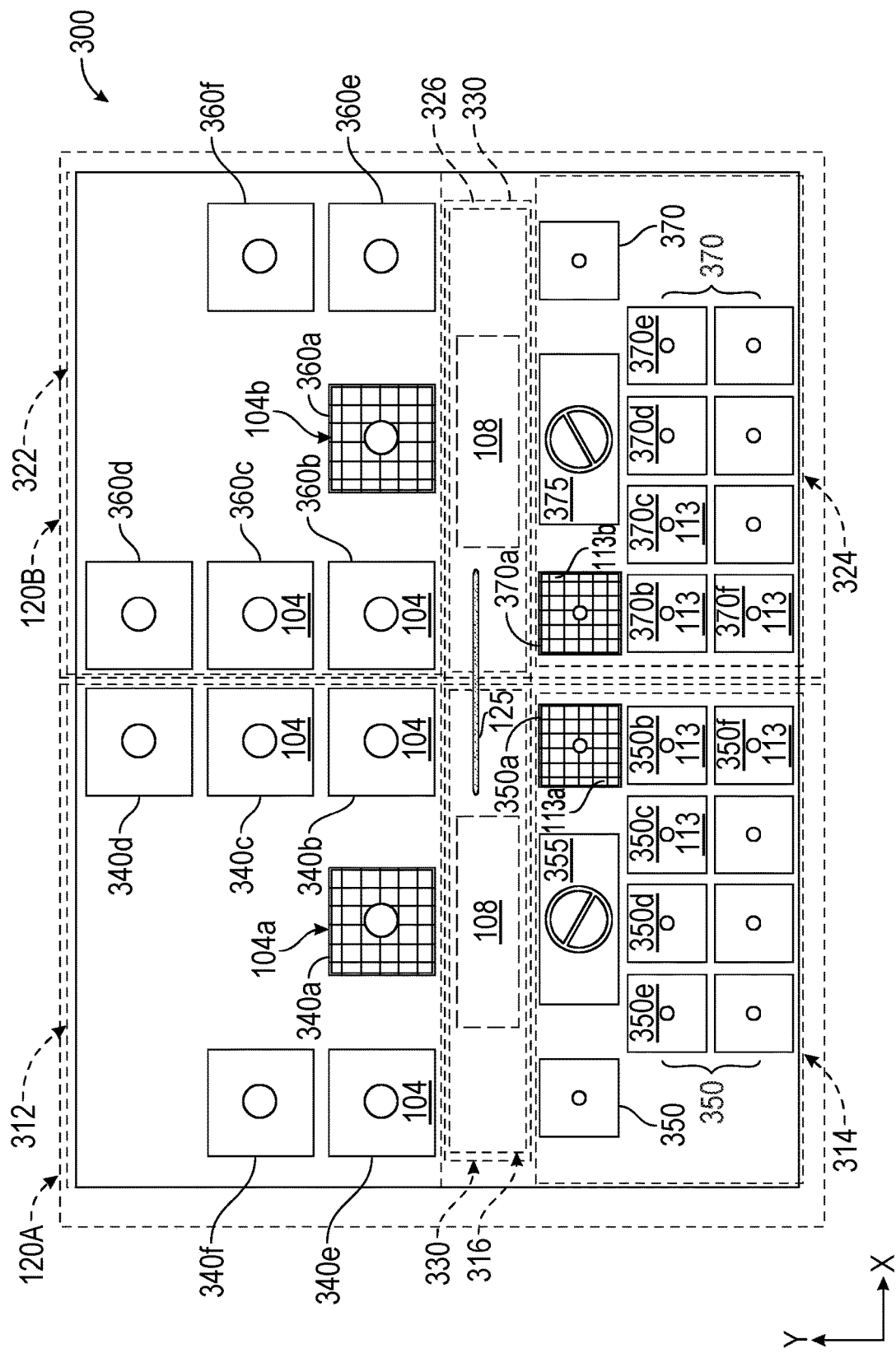
FIG. 3 is a schematic illustration of an example pendulum queue system for item transfer in an inventory system in accordance with one or more embodiments of the disclosure.

FIG. 3 is a schematic illustration of an example pendulum queue system for item transfer in an inventory system in accordance with one or more embodiments of the disclosure. Other embodiments may include additional or fewer components. The illustration of FIG. 3 is not to scale, and may not be illustrated to scale with respect to other figures. The system illustrated in FIG. 3 may be the same system discussed with respect to FIGS. 1-2B.

In FIG. 3, a top view is shown illustrating an example of a set of queues 120 (e.g., a first queue 120A and a second queue 120B) both accessible by a transfer apparatus 108. An x-direction (e.g., a lateral direction) and a y-direction (e.g., a direction perpendicular to lateral) are shown in FIG. 3 relative to the components depicted, although any other suitable reference directions may be utilized. Each queue can include a storage portion (e.g., a first storage portion 312 and a second storage portion 322) configured to receive and cycle a set of inventor holders 104, and a delivery portion (e.g., a first delivery portion 314 and a second delivery portion 324) configured to receive and cycle a set of carriers 113. Each delivery portion can be separated from the storage portion by an operating space (e.g., a first operating space 316 and a second operating space 326). The transfer apparatus 108 can be configured to move back and forth between the first queue 120A and the second queue 120B. Such configuration of the inventory system can be referred as a pendulum queue system. The back-and-forth movement can enable the transfer apparatus 108 to efficiently perform inventory processing, e.g., reducing downtime within a particular queue. For example, the transfer apparatus 108 can transfer items between an inventory holder and a carrier within a queue (e.g., the first queue 120A) while the other queue (e.g., the second queue 120B) can cycle the inventory holders 104 within its storage portion (e.g., the second storage portion 322). Thus, in a particular duration of time in which the transfer apparatus 108 is active within one queue (e.g., the first queue 120A), the other queue (e.g., the second queue 120B) can be made ready for transferring item(s) by the transfer apparatus 108, thereby reducing any downtime that may be experienced due to waiting for cycling within the queue where the transfer apparatus 108 has most recently operated. After finishing transferring the item(s) in one queue, the transfer apparatus 108 can quickly move to the other queue which is already ready for transferring items. Such coordination between transferring items in one queue while preparing the other queue for transferring another item can substantially reduce the inventory handling time. Additionally, in various embodiments, each of the queues and the transfer apparatus 108 can be configured to directly drop off the item at the carrier 113 to expedite an item transferring process between the inventory holder 104 and the carrier 113. Options for construction and working of the transfer apparatus 108 for such direct drop off are further discussed herein.

The operating spaces 316 and 326 can be clear of any obstructions or moving components, which can allow the transfer apparatus 108 to move freely within a work envelope 330. In other words, the transfer apparatus 108 may be able to move without needing to wait for other components to clear its travel path, analyze or sense intervening objects, etc. As a result, the transfer apparatus 108 may be capable of a faster travel time compared to other types of robots or movable drive units used for transferring items. The work envelope 330 of the transfer apparatus 108 may include at least parts of each of the operating spaces 316 and 326, e.g., to enable the transfer apparatus to readily move between and/or into each of the queues 120A and 120B (e.g., as illustrated by arrow 125).

In some embodiments, each queue (e.g., the first queue 120A and the second queue 120B) can include a set of storage work cells (e.g., a first set of storage cells 340a-340f, collectively referred to as cells 340, and a second set of storage cells 360a-360f, collectively referred to as cells 360) through which inventory holders 104 are cyclable. A storage cell can be a location within the storage portion and sized to receive a single inventory holder 104. For example, each of the storage cells 340 as depicted in FIG. 3 is located within the first storage portion 312 to receive a single inventory holder 104. Similarly, each of the storage cells 360 is located within the second storage portion 322 to receive a single inventory holder 104. The storage cells 340 and 360 can be arranged in a line, or an array within the respective storage portions 312 and 322 of the respective queues 120A and 120B. As discussed, each of the inventory holders 104 can be carried and moved by a mobile drive unit 102. Accordingly, the mobile drive unit 102 can be instructed to move between the storage cells in a predetermined order. As such, the cycling of the inventor holders 104 within the storage portion can be performed by moving the mobile drive unit 102 carrying an inventory holder at one storage cell (e.g., at 340c) to another storage cell (e.g., 340b) in the predetermined order.

In some embodiments, a delivery portion of a queue (e.g., the first queue 120A and the second queue 120B) can be configured to cycle through the carriers 113. In some embodiments, the carriers can be a conveyor or coupled to a conveyor to cycle through the items to be picked up or stored. In some embodiments, each delivery portion can include a set of delivery work cells (e.g., a first set of deliver work cells 350a-350f, collectively referred as cells 350, and a second set of delivery work cells 370a-370f, collectively referred as cells 370) through which carriers 113 (e.g., a mobile drive unit 102 configured to receive or deliver an item) are cyclable. A delivery cell can be a location within the delivery portion and sized to receive a single carrier 113. For example, each of the delivery work cells 350 as depicted in FIG. 3 is located within the first delivery portion 314 to receive a single carrier 113. Similarly, each of the delivery work cells 370 is located within the second delivery portion 324 to receive another single carrier 113. The delivery cells 350 and 370 can be arranged in a line, or an array within the respective delivery portions 314 and 324 of the respective queues 120A and 120B. As discussed, each of the carriers 113 (e.g., a mobile drive unit 102 configured to receive or deliver an item) can be moved relative to each other in a predetermined order. Accordingly, the cycling of the carriers 113 within the delivery portion can be performed.

In some embodiments, each of the first storage portion 312 and the second storage portion 322 includes an assigned location also referred to as an assigned holder location or an assigned storage work cell (e.g., a first assigned storage work cell 340a and a second assigned storage work cell 360a) at which a particular inventory holder (e.g., a first inventory holder 104a and a second inventory holder 104b) can be positioned during transferring the item. Similarly, each of the first delivery portion 314 and the second delivery portion 324 can include another assigned location also referred to as an assigned carrier location or an assigned delivery work cell (e.g., a first assigned delivery work cell 350a and a second assigned delivery work cell 370a) at which a carrier is positioned during transferring the item. These assigned locations or cells 340a and 350a (and similarly the assigned locations 360a and 370a) can be located adjacent to the operating space 316 (or 326) within which the transfer apparatus 108 can move to transfer items. As such, the transfer apparatus 108 can easily access an item at the assigned locations without any obstructions. The assigned locations may also ensure instant availability of the particular inventory holder 104a (or 104b) and the carrier 113a (or 113b) to the transfer apparatus 108 during an item transfer process.

In some embodiments, the first assigned storage work cell 340a can be laterally offset (e.g., in the x-direction) from the first assigned delivery work cell 350a, and the second assigned storage work cell 360a can be laterally offset (e.g., in the x-direction) from the second assigned delivery work cell 370a. These lateral offsets may facilitate synching time tolerance between the particular inventory holder 104a (or 104b) and the particular carrier 113a (or 113b) without affecting a total item transfer time of the transfer apparatus 108.

During the time interval of transferring the items, both the particular inventory holder 104a (or 104b) and the particular carrier 113a (or 113b) may be instantly available to the transfer apparatus 108. In some embodiments, the particular inventory holder 104a (or 104b) and the particular carrier 113a (or 113b) can arrive at the same time or one after the other through the cycling process. In either case, the particular inventory holder 104a (or 104b) and the carrier 113a (or 113b) may be instantly available to the transfer apparatus 108 to avoid delays in inventory processing. For example, the particular inventory holder 104a can arrive first at the assigned location 340a so that the transfer apparatus 108 can start extracting an item from the inventory holder 104a, and the particular carrier 113a can be moved to arrive into the assigned location 350a slightly later such that when the transfer apparatus 108 carrying the extract item arrives at the assigned location 350a, the particular carrier 113a is available to receive the extracted item.

In some embodiments, each of the first delivery portion 314 and the second delivery portion 316 may include a clearance cell (e.g., a first clearance cell 355 and a second clearance cell 375). The clearance cell can be a portion free of any inventory system components that may potentially obstruct or interfere with the transfer apparatus 108. The clearance cell (e.g., the cell 355 and the cell 375) can be located opposite to the respective assigned storage work cell (e.g., the assigned cells 340a and 360a) to facilitate translation of the transfer apparatus while carrying the item without collision with a carrier. For example, a portion of the transfer apparatus 108 may extend into the delivery portion. As such, during extracting and/or delivering of items, the clearance cell can provide an unobstructed working space to the transfer apparatus 108. Additionally or alternatively, the clearance cell 355 in cooperation with the lateral offset (e.g., between the assigned storage work cell 340a and the assigned delivery work cell 350a) may facilitate free movement of the header 630 so that there is no height conflict with a carrier if the header 630 is moving up and down along the inventory holder.

Figure 4:
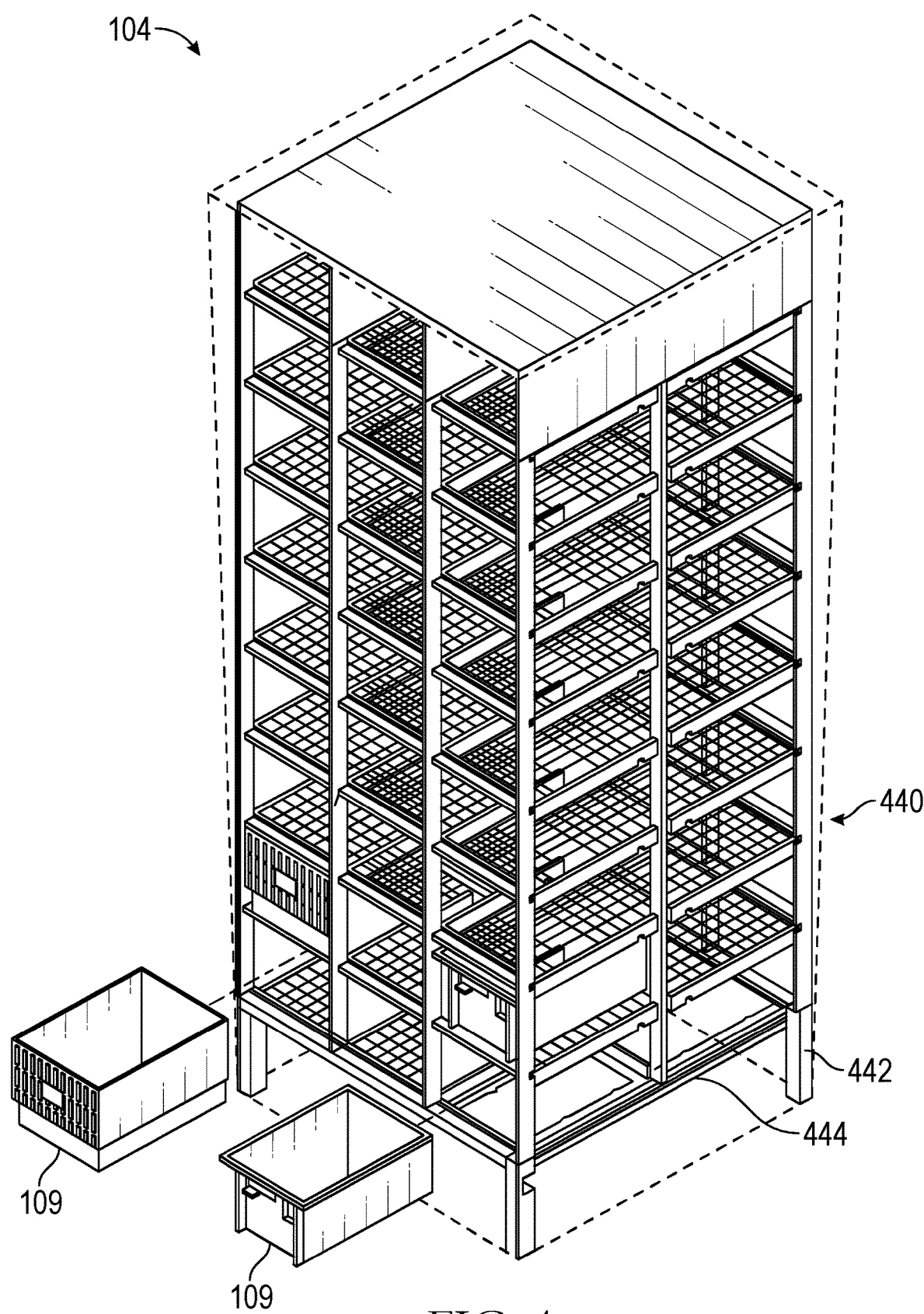
FIG. 4 is a schematic illustration of example components relative to an example of an inventory holder in accordance with one or more embodiments of the disclosure.

FIG. 4 is a schematic illustration of example components relative to an example of an inventory holder in accordance with one or more embodiments of the disclosure. Other embodiments may include additional or fewer components. The illustration of FIG. 4 is not to scale, and may not be illustrated to scale with respect to other figures. The system illustrated in FIG. 4 may be the same system discussed with respect to FIGS. 1-3.

The inventory holder 104 may correspond to a shelving unit and/or otherwise include a suitable frame 440 for supporting containers 109 and/or other inventory items. The frame 440 can include legs 442 and storage shelves 444. The legs 442 may support the storage shelves 444. For example, the storage shelves 444 may be supported so that the storage shelves 444 are vertically distributed along the inventory holder 104.

In various embodiments, the legs 442 may be sized to form device openings suitably sized to permit a mobile drive unit 102 to drive between the legs 442. The mobile drive unit 102 may utilize the coupling head 530 (e.g., FIG. 5) to engage a coupling surface (e.g., a load-bearing surface) of the frame 440 for lifting the inventory holder 104. For example, the load-bearing surface of the frame 440 may be positioned along an underside of a lowermost storage shelf 444 of the inventory holder 104.

Each storage shelf 444 may be suitably sized and/or otherwise configured to receive and support a plurality of items. For example, in FIG. 4, each storage shelf 444 is shown having suitable bays for receiving three containers 109 (e.g., which may have form factors of totes), although non-containerized items may be utilized additionally or alternatively. Like or similar types of containers 109 and/or items may be stored in the inventory holder. For example, although to different types of containers 109 are shown by way of example in FIG. 4, any number of types of containers 109 and/or items may be included in the inventory holder 104. Any suitable number of rows and/or columns may be utilized. The storage shelf 444 may be sized for containing multiple containers 109 end to end along a depth of the storage shelf 444. In some embodiments, corresponding components for interacting with the inventory holder 104 may include suitable structure for reaching in to pull containers 109 or other items from positions arranged multiple deep along the depth direction from a front face of the inventory holder 104.

Additionally or alternatively, the inventory holder 104 may be rotatable or otherwise movable (e.g., by a mobile drive unit 102) to provide access to containers 109 or items on a different side other than the front face of the inventory holder 104. In some embodiments, the storage shelves 444 may be arranged to allow containers 109 or other items to be inserted through one face and removed through another (e.g., in a pass-through arrangement).

FIG. 5 is a schematic illustration of examples of components relative to an example of a mobile drive unit in accordance with one or more embodiments of the disclosure. Other embodiments may include additional or fewer components. The illustration of FIG. 5 is not to scale, and may not be illustrated to scale with respect to other figures. The system illustrated in FIG. 5 may be the same system discussed with respect to FIGS. 1-4.

The mobile drive unit 102 can include a body 502 dimensioned to house various components and/or systems of the mobile drive unit 102. For example, the body 502 can include suitable panels or other structural members of any suitable materials to form a protective enclosure for the components and/or systems. The body 502 can house and/or support features such as a coupling system 508, a controller 512, a drive system 514, a power storage device 516 (e.g., a battery), one or more indicator lights 517, and/or one or more sensors 518. However, the body 502 can include, house, and/or support any suitable mobile drive unit components.

The power storage device 516 can provide power to the coupling system 508, the controller 512, the drive system 514, the indicator lights 517, and/or the sensor(s) 518. For example, the power storage device 516 can include one or more battery modules that can provide power to the components of the mobile drive unit 102. In various embodiments, the power storage device 516 can include rechargeable battery packs. For example, mobile drive units 102 can engage with a docking system to recharge the battery packs. Additionally or alternatively the power storage device 516 can be removed and replaced with a fully charged power storage device 516.

The coupling system 508 can engage with the inventory holder 104 or other components. For example, the coupling system 508 may engage with the inventory holder 104 to allow the mobile drive unit 102 to move the inventory holder 104 (e.g., around the workspace 112). The coupling system 508 can additionally or alternatively allow the drive unit 120 to lift the inventory holder 104, propel the inventory holder 104, rotate inventory holder 104, and/or move the inventory holder 104 in any other appropriate manner. The coupling system 508 may include suitable connectors 520 or other structure to facilitate establishing communication of power, instructions, data, physical support, etc. between the mobile drive unit 102 and the inventory holder 104 or other structures. Non-limiting examples may include electrical contacts, pneumatic hose junctures, near field communication components, or other structures for establishing conduits of mediums for communication.

In some embodiments, the coupling system 508 may include a coupling head 530 that may include any appropriate combination of components, such as ribs, spikes, and/or corrugations, to couple with, support, and/or facilitate manipulation of inventory holder 104 (such as lifting, propelling, rotating, moving, and/or actuating). For example, the coupling head 530 may include a high-friction portion that abuts a portion of the inventory holder 104 and provides frictional forces that may induce translational and rotational movement in the inventory holder 104 when the coupling head 530 moves and rotates, respectively. As a result, mobile drive unit 102 may be able to manipulate inventory holder 104 by moving or rotating the coupling head 530, either independently or as a part of the movement of mobile drive unit 102 as a whole.

The coupling system 508 may include a coupling actuator 532 that moves the coupling head 530 toward the inventory holder 104 to facilitate coupling of the mobile drive unit 102 and the inventory holder 104. The coupling actuator 532 may also be capable of adjusting the position or orientation of coupling head 530 in other suitable manners to facilitate coupling. The coupling actuator 532 may include any appropriate components, based on the configuration of mobile drive unit 102 and inventory holder 104, for moving the coupling head 530 or otherwise adjusting the position or orientation of coupling head 530. As non-limiting examples, the coupling actuator 532 may include a motorized shaft or screw drive attached to the coupling head 530 and operable to lift the coupling head 530 as appropriate for coupling with inventory holder 104.

The controller 512 can include one or more computer processors (also referred to as processors) and a memory. The one or more computer processors may be implemented in any suitable form, such as a microprocessor, an application-specific integrated circuit (ASIC), and so forth. The memory may include a variety of computer-readable media selected for their size, relative performance, or other capabilities: volatile and/or non-volatile media, removable and/or non-removable media, etc. The controller 512 can be configured to implement one or more techniques described herein for operating the inventory holder 104, for example.

The one or more sensors 518 can be or include sensors that can aid in navigation around the environment (e.g., around the workspace 112). The sensors 518 can be or include inertial sensors, navigational sensors, and so forth. In various embodiments, for example embodiments where the mobile drive unit 102 is operating in an unstructured field, the mobile drive unit 102 can be equipped with sensors 518 that can be used for navigation through the unstructured field. The sensors 518 can be part of an obstacle detection system that can detect obstacles (e.g., objects, individuals, and/or items in the workspace 112), physical barriers, fiducials 114, and/or other mobile drive units 102 within the environment (e.g., workspace 112). The sensors 518 can additionally or alternatively be or include visual sensors (e.g., cameras), ranging sensors (e.g., radar, lidar), proximity sensors, an impact sensor, a color sensor, a magnetic sensor, an electrical sensor, a cliff sensor, a brightness sensor, a spectrometer, a photometer, and/or any suitable sensors 518 for detecting obstacles and/or objects in the workspace 112.

In various embodiments, the sensor 518 can be or include a downward-facing camera configured to detect fiducials 114 (or fiducial markers) on the floor of the environment (e.g., workspace 112), e.g., to facilitate navigation of the mobile drive unit 102. In various embodiments, the sensor 518 can be or include an upward-facing camera configured to detect fiducials 114 (or fiducial markers) on underside of an inventory holder 104 (e.g., to facilitate appropriate operation of the coupling system 508 for coupling with the inventory holder 104). The controller 512 can receive sensor signals from the sensors 518 and perform processing on the sensor signals. For example, the computer processor(s) of the controller 512 can perform image processing on the sensor signals (e.g., images) received from the sensors 518 to detect obstacles, physical barriers, etc.

In further embodiments, the computer processor(s) of the controller 512 can perform navigation control based on the sensor signals (e.g., images) received from the sensors 518. As noted above, the workspace 112 associated with the inventory system 100 can include a number of fiducials 114 distributed to cover all or a portion of the workspace 112. In such embodiments, the sensors 518 can detect the fiducials within the field-of-view of the sensors 518 (e.g., on the floor of the workspace 112). The controller 512 can determine location information that includes a position and orientation of the mobile drive unit 102, via processing an image captured by the sensors 518 encompassing one or more of the fiducials 114. As a result, the controller 512 can maintain an accurate indication of the location and orientation of the mobile drive unit 102 to aid in navigation when moving the mobile drive unit 102 within the workspace 112. In some embodiments, the controller 512 can transmit the sensor signals from the sensors 518 to another computing system (e.g., management module 110), for example, to determine location information of the mobile drive unit 102. In this embodiment, the other computing system may transmit navigational commands to the mobile drive unit 102, based on the location information.

The controller 512 can generate one or more control signals for the drive system 514 to actuate the mobile drive unit 102 over the floor of the environment. The one or more control signals for the drive system 514 can be based on at least one of the sensor signals from the sensors 518. In some embodiments, the controller 512 can further receive sensor signals from a navigational sensor (which may be implemented in the mobile drive unit 102 or in an external computing device) and the one or more control signals for the drive system 514 can be further based on the sensor signals from the navigational sensor.

The drive system 514 can include a powertrain (e.g., electric motor(s) 522 and drivetrain components) (not shown) and wheels 524. In some embodiments, the mobile drive unit 102 can use differential steering to turn the mobile drive unit 102 without separately steering the wheels 524. For example, the mobile drive unit 102 may be able to perform neutral turns by rotating, within a pair of axially-aligned wheels, one wheel in a forward direction and the other wheel in a reverse direction. Further, in some embodiments, the mobile drive unit 102 may include one or more stabilizer wheels 534 that are not driven by the drive system 514.

In some embodiments, the mobile drive unit 102 can include one or more indicator lights 517 (e.g., located at any suitable location or combination of locations along the body 502). The controller 512 can selectively illuminate the indicator lights 517 of the mobile drive unit 102. The indicator lights 517 can convey any suitable information to human operators collocated within the environment. For example, the controller 512 can operate the indicator lights 517 to indicate that the mobile drive unit 102 is moving, a direction that the mobile drive unit 102 is moving, how fast the mobile drive unit 102 is moving, whether the mobile drive unit 102 is engaged with an inventory holder 104, whether the mobile drive unit 102 detects an obstacle, a physical barrier, and/or a fiducial 114, and so forth. The controller 512 can additionally or alternatively illuminate the indicator lights 517 in any manner suitable to convey the different information. For example, the controller 512 can control the colors displayed by the indicator lights 517, illumination patterns, and so forth.

In some embodiments, the mobile drive unit 102 can include and/or be coupled with a carrier 113. For example, the mobile drive unit 102 is depicted as coupled with a carrier 113, although the mobile drive unit 102 may be separated from the carrier 113 (e.g., in an alternate mode of operation) to facilitate engagement with an inventory holder 104 and/or other component of the inventory system 100.

The carrier 113 can include suitable structure for carrying one or more containers 109 and/or one or more other inventory items. In FIG. 5, the carrier 113 is represented as a cradle having a floor and walls, although any other structure may be utilized. In FIG. 5, the carrier 113 is also shown supported from the mobile drive unit 102 by a coupler 520 that includes a post, although any other form factor or structure may be utilized for engagement and/or support relative to the mobile drive unit 102. The carrier 113 may be permanently coupled or releasably coupled with the mobile drive unit 102. In some examples, the carrier 113 may correspond to a part of a conveyor system that may include rollers, belts, and/or other conveyor structure may be capable of transporting containers 109 and/or other items to and/or from a particular location independent of a mobile drive unit 102.

In some embodiments, the carrier 113 may be capable of facilitating transfer of a container 109 and/or other inventory item relative to the carrier 113. As one example, the carrier 113 is depicted in FIG. 5 as including a transporter 515 that may include a belt that may be driven to assist with moving a container 109 and/or other inventory item onto and/or off of the carrier 113. However, rollers, rams, pushers, pullers, actuators, or any other form of transporter 515 may be utilized.

Figure 6:
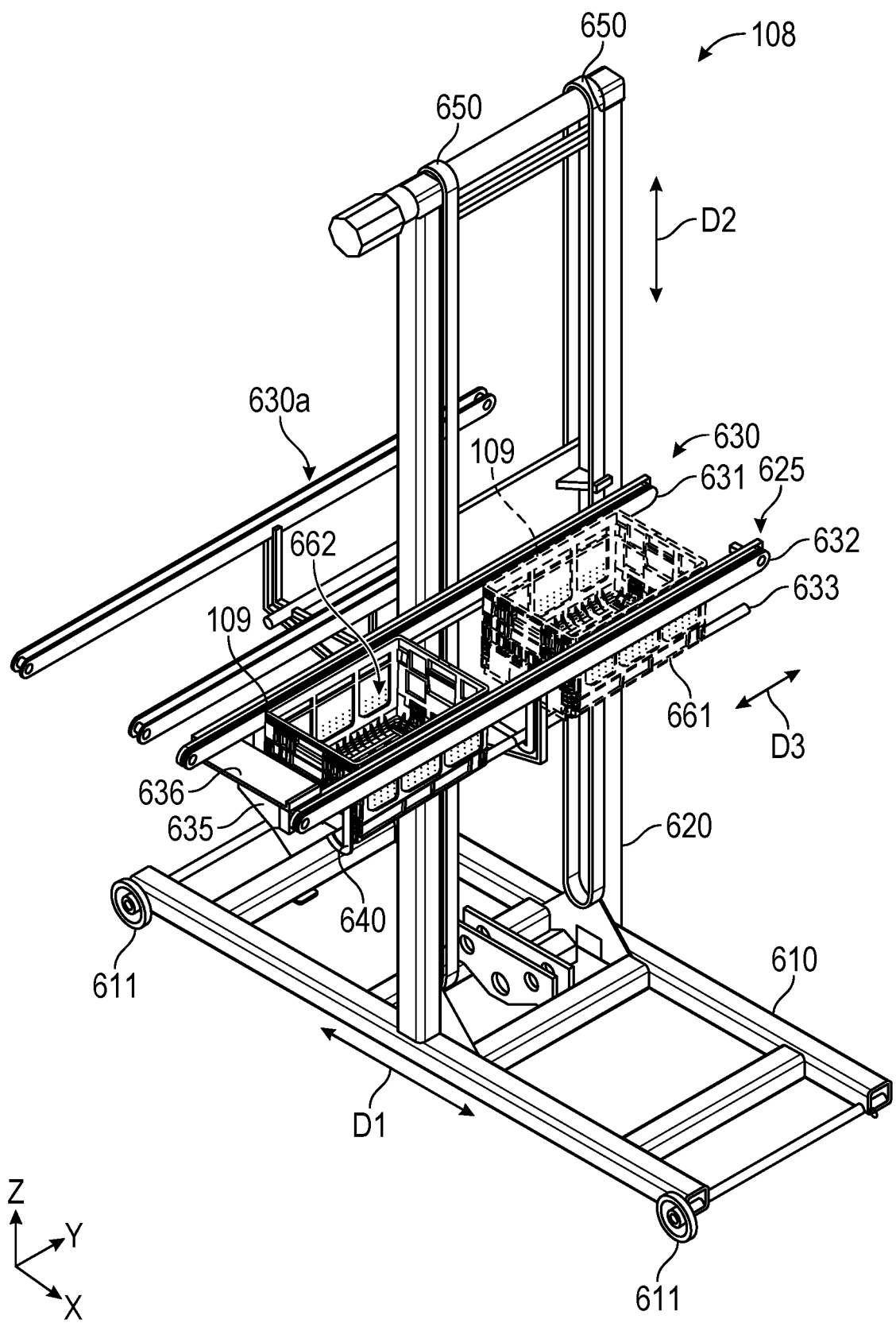
FIG. 6 is a schematic illustration of an example transfer apparatus in accordance with one or more embodiments of the disclosure.

FIG. 6 is a schematic illustration of an example transfer apparatus in accordance with one or more embodiments of the disclosure. Other embodiments may include additional or fewer components. The illustration of FIG. 6 is not to scale, and may not be illustrated to scale with respect to other figures. The system illustrated in FIG. 6 may be the same system discussed with respect to FIGS. 1-5.

In FIG. 6, the transfer apparatus 108 can be configured to move and extract an item from an inventory holder 104, carry the item to a carrier 113, and directly drop off the item on the carrier 113. The transfer apparatus 108 can be further configured to pick up an item from a carrier 113, carry the item to the inventory holder 104, and push the item into the inventory holder 104. The transfer apparatus 108 may achieve item transferring steps by moving in a lateral direction D1, a vertical direction D2, and a depth direction D3 perpendicular to the lateral direction and the vertical direction. For example, relative to the x-, y-, and z-directions shown in FIG. 6, the lateral direction D1 may correspond to the x-direction, the vertical direction D2 may correspond to the z-direction, and the depth direction D3 may correspond to the y-direction. In some embodiments, an item may be placed in a container. In some embodiments, the container may hold a plurality of items. Additionally or alternatively, the item may be directly placed within a compartment of the inventory holder. 104. For the purposes discussion herein, items may be shown as a container for easy of visualization without limiting the scope of the present disclosure.

The transfer apparatus 108 can include a laterally movable frame 610 moveable in the lateral direction, an upright frame 620 supported by the laterally movable frame 610, and a header 630 movably coupled to the upright frame 620 and configured to move in the vertical direction. The laterally movable frame 610 may be coupled to a rail and a pulley assembly or any other suitable structure capable of facilitating movement of the laterally movable frame 610 laterally. For example, when implemented in the pendulum queue system of FIG. 3, the rail may be laid within the work envelope 330 and/or may be included at least in part in each of the first operating space 316 and the second operating space 326. The upright frame 620 may support a hoist 650 (e.g., a pulley mechanism, a rack and pinion assembly, a ball screw assembly, or other suitable driving mechanisms actuatable for imparting vertical motion). The hoist 650 may be coupled to the header 630. The hoist 650 can drive the header 630 in the vertical direction. In some embodiments, to facilitate quick transfer of items, the laterally movable frame 610 and the header 630 may be moved simultaneously. For example, after the item 109 is extracted from the inventory holder (e.g., 104a), the laterally movable frame 610 can be moved laterally (e.g., on wheels 611) while the header 630 can be translated in the vertical direction by the hoist 650.

The header 630 can include an item carriage 625 extending along a depth direction perpendicular to the lateral direction and the vertical direction, an extractor 635 actuatable along the depth direction and configured to engage with an item, and a claw assembly 640 configured to open or close. The header 630 can be configured to directly drop off an item by vertically moving the item carriage 625 to align its bottom open portion with a carrier 113 and activating the claw assembly 640 to release an item from the bottom open portion.

The item carriage 625 can include a first section 661 configured for item transfer in the depth direction. The item carriage 625 may further include a second section 662 configured for item transfer in the vertical direction. In some embodiments, the second section 662 includes a bottom opening, which may facilitate quick drop-off of an item 109 from the item carriage 625 on to a carrier 113. Also, the bottom open portion may facilitate a quick pick of an item from the carrier 113. In some embodiments, the item carriage 625 can includes side rails 631 and 632 extending along the depth axis and spaced apart to receive the item therebetween. The side rails 631 and 632 may extend along the first section 661 and the second section 662. The side rails 631 and 632 can guide the item 109 within the item carriage 625 along the depth direction while being extracted from an inventory holder (e.g., 104a). The side rails 631 and 632 can also be used to align with sides of a compartment of the inventory holder 104. The item carriage 625 can further include a bottom rail 633 disposed in the first section 661 and configured to support the item 109. For example, the item 109 when located in the first section 661 (e.g., as illustrated by phantom lines) can be supported at the bottom of the item 109 to be securely held in the item carriage 625, e.g., when the transfer apparatus 108 is moving in the lateral direction and/or the vertical direction.

In some embodiments, the first section 661 of the item carriage 625 can be supported by the upright frame 620, and the second section 662 of the item carriage 625 may extend beyond the upright frame 625 in the depth direction. As such, when the transfer apparatus 108 moves within the operating spaces (e.g., 316 and 326), the second section 662 can extend and align the item 109 over the carriage (e.g., 113a) to facilitate a direct drop off or pick up relative to the carriage 113.

In some embodiments, the extractor 635 can be coupled to the item carriage 625 and configured to pull an item from an inventory holder into the item carriage 635. The extractor 635 can be configured to pull the item 109 into the first section 661 (e.g., into the position shown in phantom lines) and further into the second section 662 over the claw assembly 640 in a closed state (e.g., into the position shown in solid lines). The extractor 635 can also be configured to push the item 109 into an empty compartment of the inventory holder (e.g., 104a). For example, an item 109 picked up in the second section 662 can be pushed by the extractor 635 (e.g., along the depth direction) into the inventory holder (e.g., 104a).

In some embodiments, the extractor 635 can be coupled to an extractor carriage 636, which can be slidably coupled with the item carriage 625 to move the extractor 635 in the depth direction. The extractor carriage 636 can extend between the side rails 631 and 632, and the extractor 635 can be located at a top or around a center of the second section 662. In some embodiments, the side rails 631 and 632 can be configured to include sliding rails or slots extending in the depth direction to guide the extractor carriage 636. By actuating the extractor carriage 636, the extractor 635 can be moved in the depth direction. In some embodiments, the extractor 635 can be or include a suction cup, a gripper, a hook, or other mechanism configured to engage with the item 109 in the inventory holder (e.g., 104a).

In some embodiments, the claw assembly 640 can be disposed along the second section 662. Portions of the claw assembly 640 can extend along the bottom open portion 663 of the header 630. Such positioning may advantageously facilitate a direct drop off in a vertical direction onto a carrier 113. The claw assembly 640 can be controlled to adjust an amount of opening of the open portion 663 of the second section 662. For example, the claw assembly 640 can be pivotably attached to the item carriage 625 to open or close to adjust a size of the opening of the bottom open portion 663.

Figure 7A:
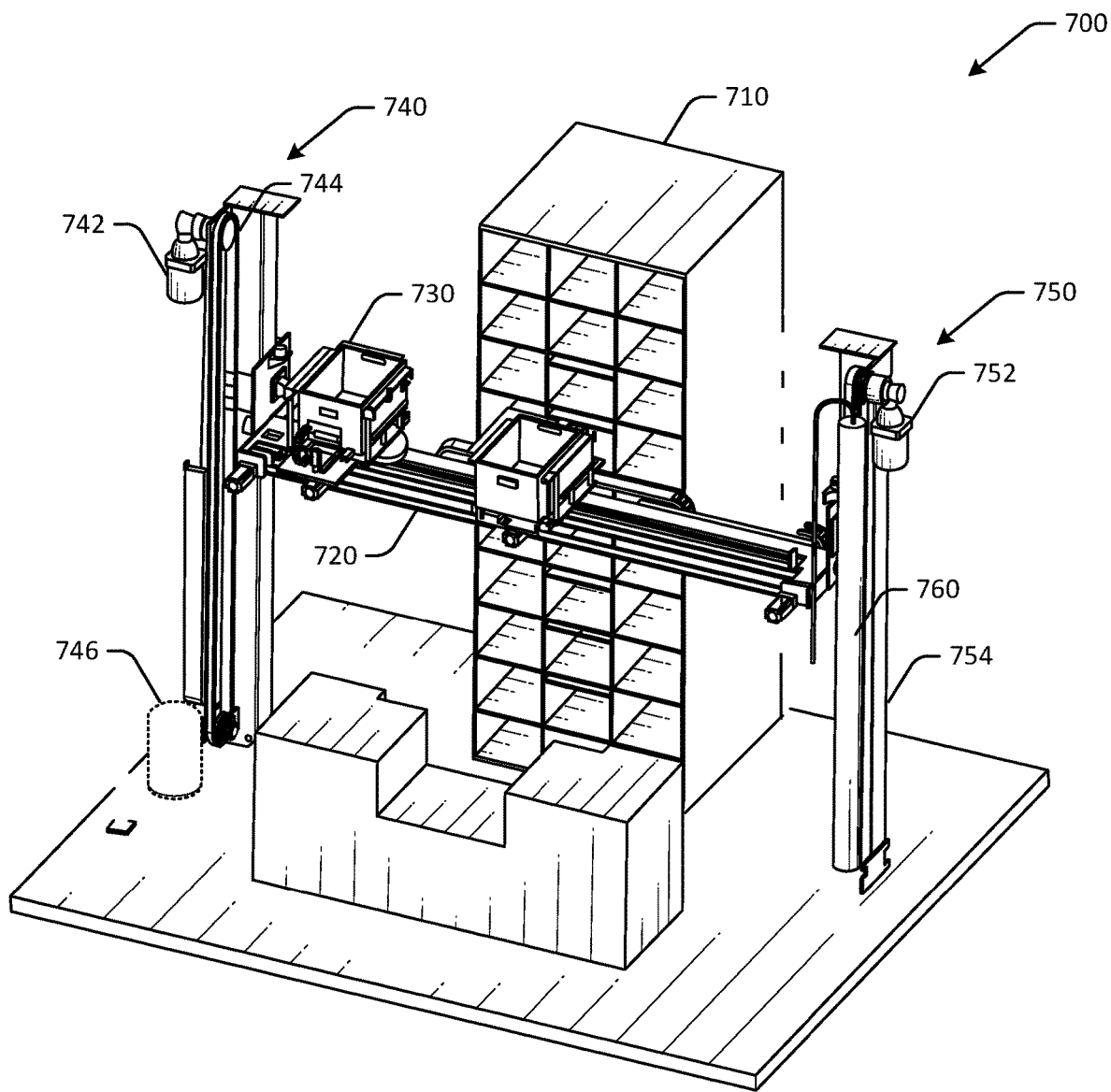
FIGS. 7A-7C are schematic illustrations of various views of a counter balance system for use with inventory systems in accordance with one or more embodiments of the disclosure.
Figure 7B:
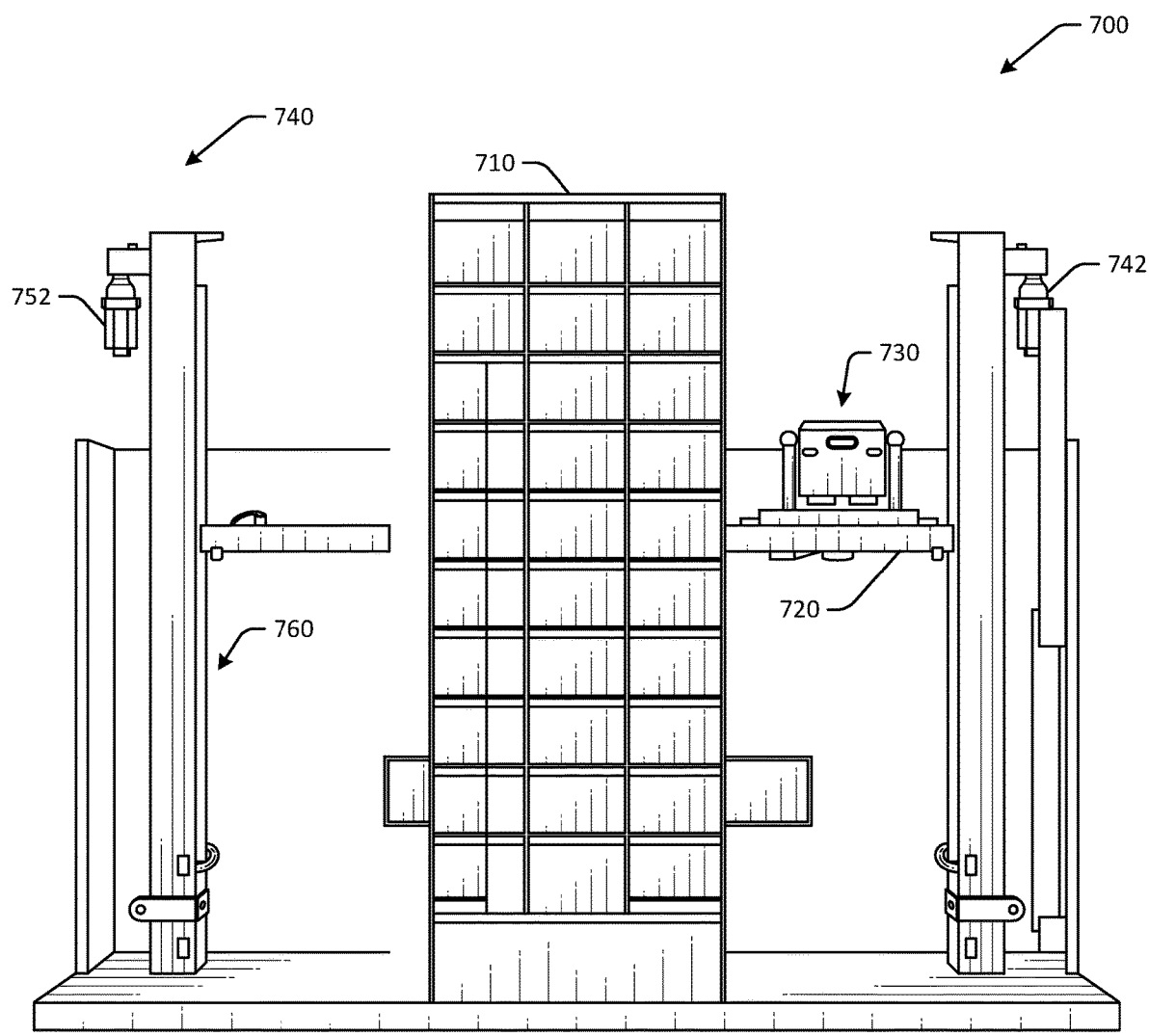
Figure 7C:
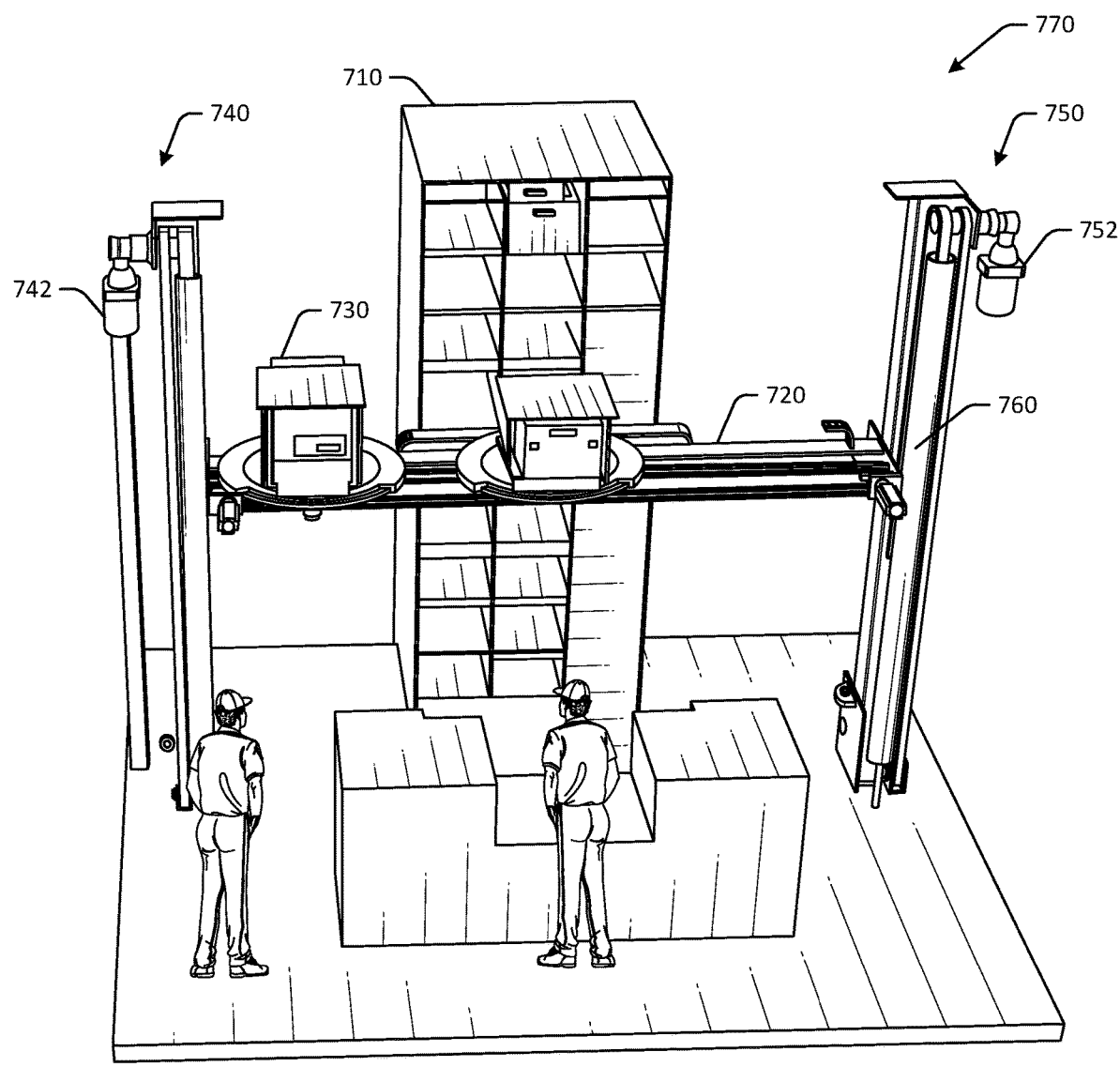

FIGS. 7A-7C are schematic illustrations of various views of a counter balance system for use with inventory systems in accordance with one or more embodiments of the disclosure. Other embodiments may include additional or fewer components. The illustrations of FIGS. 7A-7C are not to scale, and may not be illustrated to scale with respect to other figures. The systems illustrated in FIGS. 7A-7B may be the same system discussed with respect to FIGS. 1-6.

In FIGS. 7A-7C, a container handling system 700 is depicted having a counter balance system 750. The counter balance system 750 may include a pneumatic counter balance 746. The container handling system 700 may include a header 720 that can be driven vertically in upwards and downwards directions. For example, servo motors may be used to drive vertical movement of the header 720. Accelerating the header 720 mass vertically may requires a force equal to the mass of the head multiplied by gravity plus the mass multiplied by acceleration. If the header 720 weighs 350 kilograms, in an example, the desired acceleration may be 2.0 meters per second squared. As acceleration due to gravity is 9.8 meters per second squared, the force the motors must output is about 900 pounds force. If the gravity load is resisted by an air cylinder with an accumulator (e.g., accumulator 746 that is not needed in the current embodiment), the servo motors need only provide 700 Newton of force to accelerate the load. This provides the ability for smaller motors, gearboxes and other drive train components and lower costs. As discussed with respect to FIG. 8A, the mass of the header 720 can be counter balanced by an equivalent kg-force air cylinder 840, where tension on the assembly end of a belt 830 can be balanced by tension generated by the air cylinder 840.

The container handling system 700 may be configured to place and extract containers from a container pod 710. One or more handling units 730 may move laterally along the header 720 to transport containers in lateral directions, and to support containers during vertical movement of the header 720. The container handling system 700 may include the handling units 730 and/or a laterally movable frame moveable in a lateral direction, as well as an upright frame supported by the laterally movable frame. The header 720 may be movably coupled to the upright frame and configured to move in a vertical direction.

The header 720 may include an extractor and a support assembly, one or both of which may be part of the handling unit 730. The support assembly may be configured to open and close, and may be configured to receive an item from the extractor. The header 720 may include the handling unit 720, which may be an item carriage extending along a depth direction perpendicular to the lateral direction and the vertical direction. The extractor may be coupled to the item carriage and configured to pull an item from an inventory holder into the item carriage. In some embodiments, the support assembly may be a claw assembly configured to open and close, where the extractor is configured to pull an item over the claw assembly in a closed state, and the claw assembly is configured to open for releasing the item directly over a carrier.

The container handling system 700 may include an assembly, such as a pulley assembly 740, 750 configured to drive vertical movement of the header 720, and a counter balance 760 coupled to the pulley assembly 754. Other assemblies, such as rack and pinion assemblies, ball screw assemblies, etc. may be used. The counter balance 760 may provide a counter balance to header movement (e.g., to offset vertical movement of the header 720, etc.) and/or the counter balance provides a force to counter gravitational force exerted on the header. The container handling system 700 may include a first pulley assembly 740 that may have a first belt 744 driven by a first motor 742. The container handling system 700 may include a second pulley assembly 750 that may have a second belt 754 driven by a second motor 752. An accumulator 746 may not be needed, and instead a vacuum cylinder 760 may be coupled to the second belt 754.

In some embodiments, the counter balance may be a massless counter balance. For example, a massless counter balance may be the vacuum cylinder 760. The vacuum cylinder 760 may have a piston and a cylinder, where the piston is configured to slide vertically in the cylinder a distance that corresponds to a vertical distance traveled by the header 720. The vacuum cylinder 760 may have a negative pressure area and a positive pressure area separated by the piston. In some embodiments, the vacuum cylinder 760 may be devoid of piston rod seals and/or piston rods. In other embodiments, the counter balance may have a mass or may be a mass-based counter balance. As depicted in perspective view 770 of FIG. 7C, the container handling system 700 may operate autonomously without immediate operator control.

The pulley assembly may include a first belt disposed at a first side of the upright frame and a second belt disposed at a second side of the upright frame. The container handling system may include the first motor 742 coupled to the first belt 744 and configured to move the first belt 744 in at least one direction. A second motor 752 may be included and may be coupled to the second belt 754 and configured to move the second belt in at least one direction. The first motor 742 may be configured to move the first belt in a first direction when the header is moving in an upwards vertical direction, and the second motor 752 may be configured to move the second belt 754 in the first direction, and the piston may configured to slide in a downwards vertical direction, so as to provide a counter balancing effect.

Figure 8A:
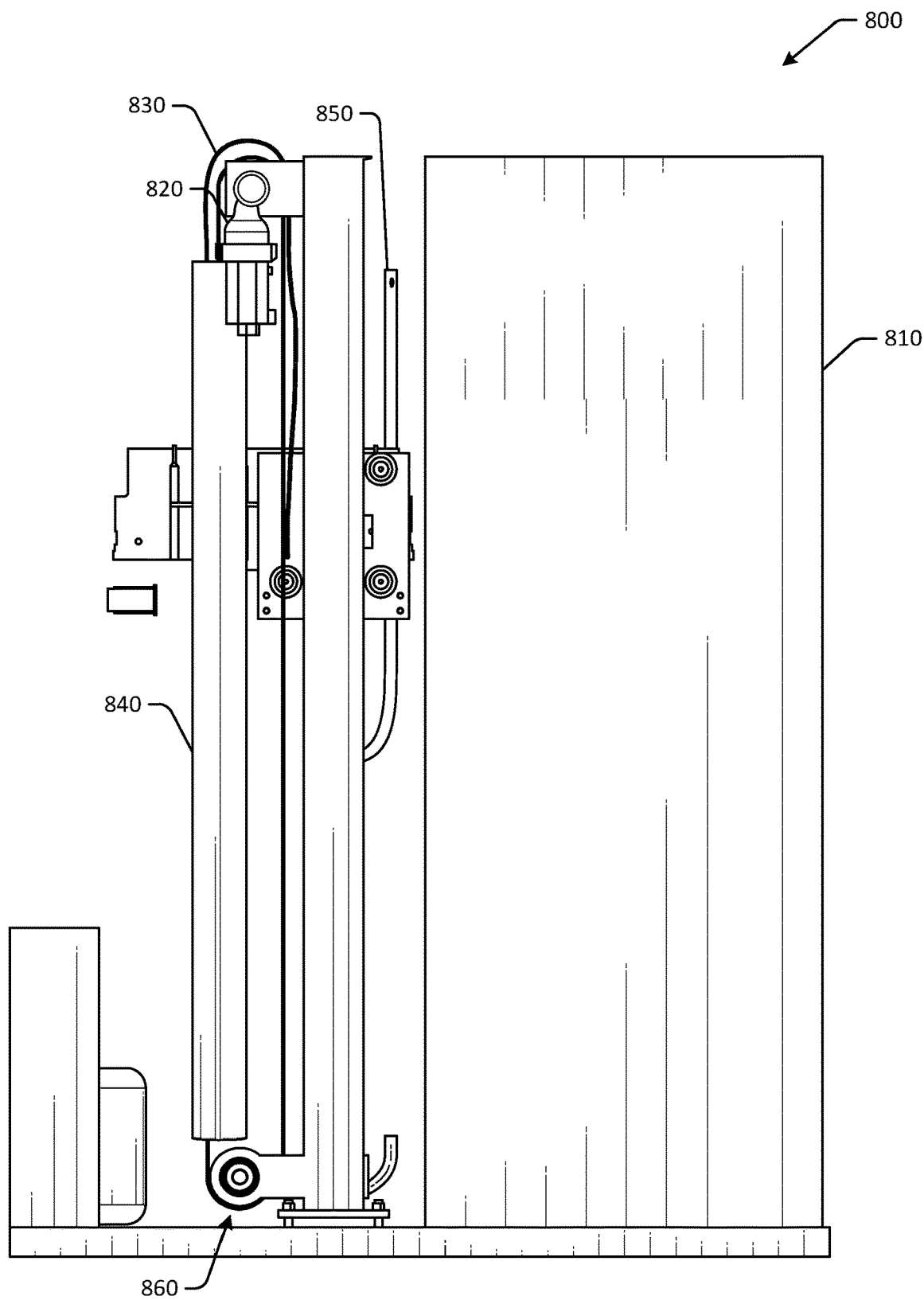
FIGS. 8A-8C are schematic illustrations of portions of a counter balance system in accordance with one or more embodiments of the disclosure.
Figure 8B:
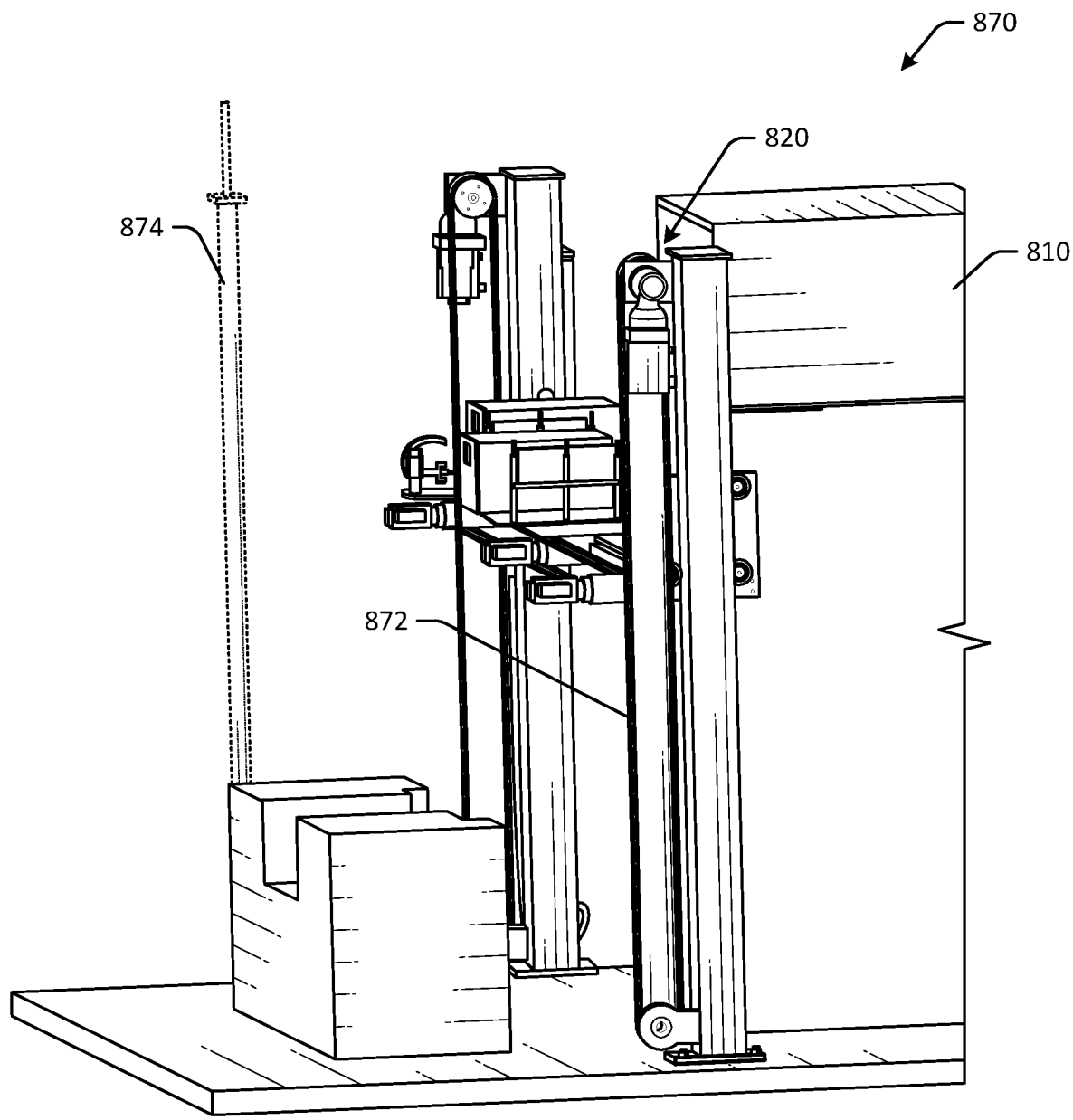
Figure 8C:
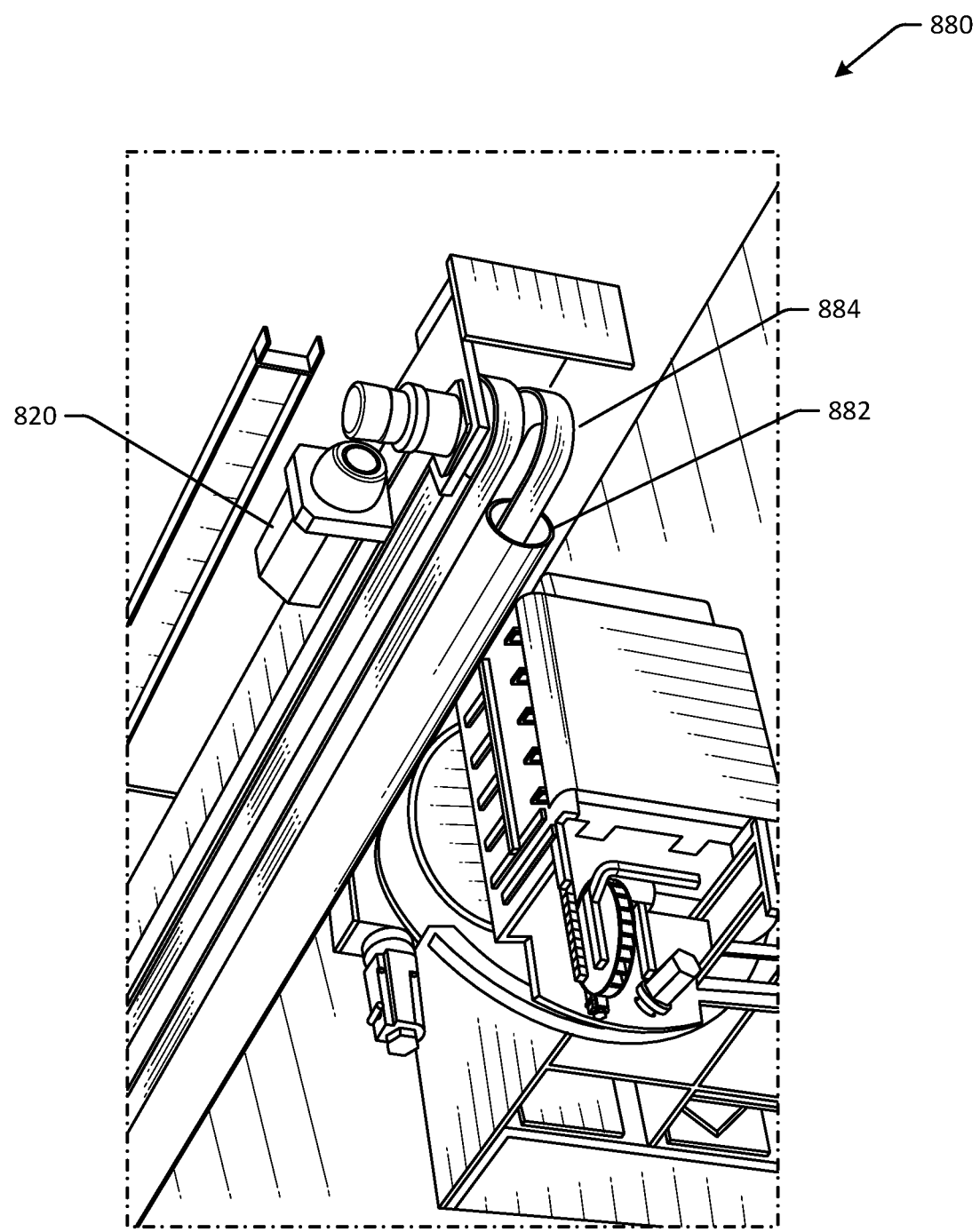

FIGS. 8A-8C are schematic illustrations of portions of a counter balance system in accordance with one or more embodiments of the disclosure. Other embodiments may include additional or fewer components. The illustrations of FIGS. 8A-8C are not to scale, and may not be illustrated to scale with respect to other figures. The systems illustrated in FIGS. 8A-8C may be the same system discussed with respect to FIGS. 1-7B.

In FIG. 8A, a container handling system 800 may include a container pod 810 from which containers may be loaded and unloaded. The container handling system 800 may have a counter balance system that includes an air cylinder 840 and accumulator 860. A motor 820 may drive a belt 830, and may be assisted by force exerted on the belt 830 by the air cylinder 840. One or more cables 850 may also be used to assist vertical movement of a header of the container handling system. The belt 830 may be wrapped about one or more pulleys 860 to form a closed loop system.

Embodiments that include vacuum cylinders may provide additional benefits relative to accumulators and/or pneumatic cylinders. As depicted in view 870 of FIG. 8B, the overall length of an air cylinder 874 for prior systems is slightly more than double the required stroke. For example, an air cylinder with 3300 mm of stroke, has an overall length greater than 6600 mm. Moreover, the cylinder displaces air during use, which may require an accumulator to achieve acceptable force variation over the stroke. The pressures may be high and may therefore utilize thicker walls and more material than a vacuum version. While vacuum cylinder embodiments do not include piston rods and/or rod seals, pneumatic cylinders may include a piston rod and a piston seal.

Where the pressurized cylinder increases pressure above ambient on the side of the piston being pulled, the vacuum decreases pressure below ambient on the opposite side to achieve a differential, as depicted in FIG. 8B. Because the pulling side of the piston is at ambient pressure, no piston rod or rod seal is required. A tensile member such as a cable 884 coupled to air cylinder piston 882 depicted in view 880 of FIG. 8C can be attached directly to the piston. In some embodiments, the piston 882 may travel laterally instead of vertically, while providing the same counterbalance effect. The vacuum cylinder embodiment may have a one atmosphere pressure differential and causes compressive rather than tensile hoop stress in the cylinder. In addition, the vacuum counter balance as descried herein creates a pressure differential that tends to pull any otherwise leaking lubricant into the cylinder, as opposed to pneumatic cylinders that tend to push lubricant out under pressure.

One or more operations of the methods, process flows, or use cases of FIGS. 1-8C may have been described above as being performed by a user device, or more specifically, by one or more program module(s), applications, or the like executing on a device. It should be appreciated, however, that any of the operations of the methods, process flows, or use cases of FIGS. 1-8C may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-8C may be described in the context of the illustrative devices, it should be appreciated that such operations may be implemented in connection with numerous other device configurations.

The operations described and depicted in the illustrative methods, process flows, and use cases of FIGS. 1-8C may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-8C may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 9:
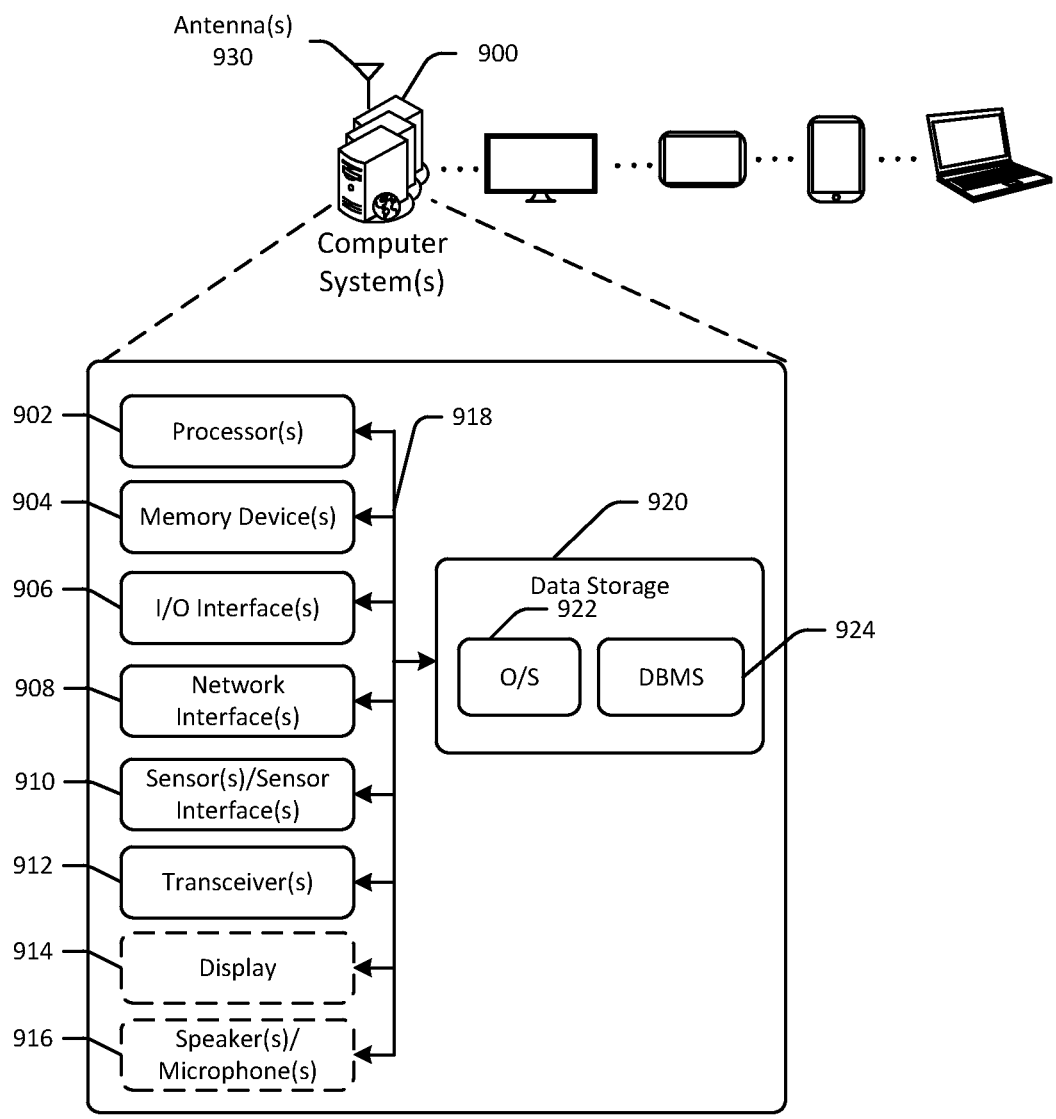
FIG. 9 schematically illustrates an example architecture of a computer system associated with a robotic system in accordance with one or more embodiments of the disclosure.

FIG. 9 is a schematic block diagram of one or more illustrative computer system(s) 900 in accordance with one or more example embodiments of the disclosure. The computer system(s) 900 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 900 may correspond to an illustrative device configuration for a computer system used in conjunction with any one of the robotic system(s) of FIGS. 1-8C, such as robotic manipulators and/or autonomous robotic vehicles.

The computer system(s) 900 may be configured to communicate with one or more servers, user devices, or the like. The computer system(s) 900 may be configured to cause the robotic system(s) to deposit containers into one or more pods, retrieve containers, transport pods, and so forth.

The computer system(s) 900 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 900 may include one or more processors (processor(s)) 902, one or more memory devices 904 (also referred to herein as memory 904), one or more input/output (I/O) interface(s) 906, one or more network interface(s) 908, one or more sensor(s) or sensor interface(s) 910, one or more transceiver(s) 912, one or more optional display(s) 914, one or more optional microphone(s) 916, and data storage 920. The computer system(s) 900 may further include one or more bus(es) 918 that functionally couple various components of the computer system(s) 900. The computer system(s) 900 may further include one or more antenna(s) 930 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 918 may include at least one of a system bus, a memory bus, an address bus, or a message bus, and may permit the exchange of information (e.g., data (including computer-executable code), signaling, etc.) between various components of the computer system(s) 900. The bus(es) 918 may include, without limitation, a memory bus or a memory controller, a peripheral bus, an accelerated graphics port, and so forth. The bus(es) 918 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 904 of the computer system(s) 900 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 904 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 904 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 920 may include removable storage and/or non-removable storage including, but not limited to, magnetic storage, optical disk storage, and/or tape storage. The data storage 920 may provide non-volatile storage of computer-executable instructions and other data. The memory 904 and the data storage 920, removable and/or non-removable, are examples of computer-readable storage media (CRSM) as that term is used herein.

The data storage 920 may store computer-executable code, instructions, or the like that may be loadable into the memory 904 and executable by the processor(s) 902 to cause the processor(s) 902 to perform or initiate various operations. The data storage 920 may additionally store data that may be copied to the memory 904 for use by the processor(s) 902 during the execution of the computer-executable instructions. Moreover, output data generated as a result of execution of the computer-executable instructions by the processor(s) 902 may be stored initially in the memory 904, and may ultimately be copied to the data storage 920 for non-volatile storage.

More specifically, the data storage 920 may store one or more operating systems (O/S) 922; one or more database management systems (DBMS) 924; and one or more program module(s), applications, engines, computer-executable code, scripts, or the like. Some or all of these module(s) may be sub-module(s). Any of the components depicted as being stored in the data storage 920 may include any combination of software, firmware, and/or hardware. The software and/or firmware may include computer-executable code, instructions, or the like that may be loaded into the memory 904 for execution by one or more of the processor(s) 902. Any of the components depicted as being stored in the data storage 920 may support functionality described in reference to corresponding components named earlier in this disclosure.

The data storage 920 may further store various types of data utilized by the components of the computer system(s) 900. Any data stored in the data storage 920 may be loaded into the memory 904 for use by the processor(s) 902 in executing computer-executable code. In addition, any data depicted as being stored in the data storage 920 may potentially be stored in one or more datastore(s) and may be accessed via the DBMS 924 and loaded in the memory 904 for use by the processor(s) 902 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 902 may be configured to access the memory 904 and execute the computer-executable instructions loaded therein. For example, the processor(s) 902 may be configured to execute the computer-executable instructions of the various program module(s), applications, engines, or the like of the computer system(s) 900 to cause or facilitate various operations to be performed in accordance with one or more embodiments of the disclosure. The processor(s) 902 may include any suitable processing unit capable of accepting data as input, processing the input data in accordance with stored computer-executable instructions, and generating output data. The processor(s) 902 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 902 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 902 may be capable of supporting any of a variety of instruction sets.

Referring now to other illustrative components depicted as being stored in the data storage 920, the O/S 922 may be loaded from the data storage 920 into the memory 904 and may provide an interface between other application software executing on the computer system(s) 900 and the hardware resources of the computer system(s) 900. More specifically, the O/S 922 may include a set of computer-executable instructions for managing the hardware resources of the computer system(s) 900 and for providing common services to other application programs (e.g., managing memory allocation among various application programs). In certain example embodiments, the O/S 922 may control execution of the other program module(s). The O/S 922 may include any operating system now known or which may be developed in the future including, but not limited to, any server operating system, any mainframe operating system, or any other proprietary or non-proprietary operating system.

The DBMS 924 may be loaded into the memory 904 and may support functionality for accessing, retrieving, storing, and/or manipulating data stored in the memory 904 and/or data stored in the data storage 920. The DBMS 924 may use any of a variety of database models (e.g., relational model, object model, etc.) and may support any of a variety of query languages. The DBMS 924 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 900 is a mobile device, the DBMS 924 may be any suitable lightweight DBMS optimized for performance on a mobile device.

Referring now to other illustrative components of the computer system(s) 900, the input/output (I/O) interface(s) 906 may facilitate the receipt of input information by the computer system(s) 900 from one or more I/O devices as well as the output of information from the computer system(s) 900 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 900 or may be separate. The I/O devices may further include, for example, any number of peripheral devices such as data storage devices, printing devices, and so forth.

The I/O interface(s) 906 may also include an interface for an external peripheral device connection such as universal serial bus (USB), FireWire, Thunderbolt, Ethernet port or other connection protocol that may connect to one or more networks. The I/O interface(s) 906 may also include a connection to one or more of the antenna(s) 930 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 900 may further include one or more network interface(s) 908 via which the computer system(s) 900 may communicate with any of a variety of other systems, platforms, networks, devices, and so forth. The network interface(s) 908 may enable communication, for example, with one or more wireless routers, one or more host servers, one or more web servers, and the like via one or more networks.

The antenna(s) 930 may include any suitable type of antenna depending, for example, on the communications protocols used to transmit or receive signals via the antenna(s) 930. Non-limiting examples of suitable antennas may include directional antennas, non-directional antennas, dipole antennas, folded dipole antennas, patch antennas, multiple-input multiple-output (MIMO) antennas, or the like. The antenna(s) 930 may be communicatively coupled to one or more transceivers 912 or radio components to which or from which signals may be transmitted or received.

As previously described, the antenna(s) 930 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 930 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11 g, 802.11n), 5 GHz channels (e.g., 802.11n, 802.11ac), or 60 GHz channels (e.g., 802.11 ad). In alternative example embodiments, the antenna(s) 930 may be configured to transmit or receive radio frequency signals within any suitable frequency range forming part of the unlicensed portion of the radio spectrum.

The antenna(s) 930 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 912 may include any suitable radio component(s) for—in cooperation with the antenna(s) 930—transmitting or receiving radio frequency (RF) signals in the bandwidth and/or channels corresponding to the communications protocols utilized by the computer system(s) 900 to communicate with other devices. The transceiver(s) 912 may include hardware, software, and/or firmware for modulating, transmitting, or receiving-potentially in cooperation with any of antenna(s) 930—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 912 may further include hardware, firmware, or software for receiving GNSS signals. The transceiver(s) 912 may include any known receiver and baseband suitable for communicating via the communications protocols utilized by the computer system(s) 900. The transceiver(s) 912 may further include a low noise amplifier (LNA), additional signal amplifiers, an analog-to-digital (A/D) converter, one or more buffers, a digital baseband, or the like.

The sensor(s)/sensor interface(s) 910 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 914 may be configured to output light and/or render content. The optional speaker(s)/microphone(s) 916 may be any device configured to receive analog sound input or voice data.

It should be appreciated that the program module(s), applications, computer-executable instructions, code, or the like depicted in FIG. 9 as being stored in the data storage 920 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 900, and/or hosted on other computing device(s) accessible via one or more networks, may be provided to support functionality provided by the program module(s), applications, or computer-executable code depicted in FIG. 9 and/or additional or alternate functionality. Further, functionality may be modularized differently such that processing described as being supported collectively by the collection of program module(s) depicted in FIG. 9 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 9 may be implemented, at least partially, in hardware and/or firmware across any number of devices.

It should further be appreciated that the computer system(s) 900 may include alternate and/or additional hardware, software, or firmware components beyond those described or depicted without departing from the scope of the disclosure. More particularly, it should be appreciated that software, firmware, or hardware components depicted as forming part of the computer system(s) 900 are merely illustrative and that some components may not be present or additional components may be provided in various embodiments. While various illustrative program module(s) have been depicted and described as software module(s) stored in the data storage 920, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1-8C may be performed by a device having the illustrative configuration depicted in FIG. 9, or more specifically, by one or more engines, program module(s), applications, or the like executable on such a device. It should be appreciated, however, that such operations may be implemented in connection with numerous other device configurations.

The operations described and depicted in the illustrative methods and process flows of any of FIGS. 1-8C may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-8C may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A container handling system comprising:
   a queue comprising a storage portion and a delivery portion separated by an operating space, the storage portion being configured to receive inventory holders and the delivery portion being configured to receive carriers;
   a transfer apparatus operable to perform item transferring operations for the queue, the transfer apparatus comprising:
      a laterally movable frame movable at least within the operating space;
      an upright frame supported by the laterally movable frame; and
      a header movably coupled to the upright frame and configured to move in a vertical direction, wherein the header comprises:
         an item carriage having a bottom open portion;
         an extractor coupled to the item carriage to pull an item from an inventory holder into the item carriage over the bottom open portion;
         a pulley assembly configured to drive vertical movement of the header; and
         a claw assembly disposed along the bottom open portion of the item carriage and configured to open for releasing the item through the bottom open portion; and
   a vacuum cylinder coupled to the pulley assembly, wherein the vacuum cylinder provides a counter balance to header movement, the vacuum cylinder comprising a piston and a cylinder, wherein the piston is configured to slide in the cylinder a distance that corresponds to a vertical distance traveled by the header.

2. The container handling system of claim 1, wherein the pulley assembly comprises a first belt disposed at a first side of the upright frame and a second belt disposed at a second side of the upright frame, the container handling system further comprising:
   a first motor coupled to the first belt and configured to move the first belt in at least one direction; and
   a second motor coupled to the second belt and configured to move the second belt in at least one direction.

3. The container handling system of claim 2, wherein the first motor is configured to move the first belt in a first direction when the header is moving in an upwards vertical direction, the second motor is configured to move the second belt in the first direction, and the piston is configured to slide in a downwards vertical direction.

4. The container handling system of claim 1, further comprising:
   a controller configured to control movement of the laterally movable frame within the operating space of the queue, the header in the vertical direction to align with the item from the inventory holder in the storage portion, the extractor to pull the item from the inventory holder into the item carriage and into position over the claw assembly, and the claw assembly to open to release the item so as to be directly dropped off onto a carrier in the delivery portion.

5. A container handling system comprising:
a laterally movable frame moveable in a lateral direction;
an upright frame supported by the laterally movable frame; and
a header movably coupled to the upright frame and configured to move in a vertical direction, wherein the header comprises:
an extractor; and
a support assembly configured to open and close, wherein the support assembly is configured to receive an item from the extractor;
an assembly configured to drive vertical movement of the header; and
a counter balance coupled to the assembly, wherein the counter balance provides a force to counter gravitational force exerted on the header.

6. The container handling system of claim 5, wherein the counter balance is a massless counter balance.

7. The container handling system of claim 6, wherein the massless counter balance is a vacuum cylinder comprising a piston and a cylinder, wherein the piston is configured to slide in the cylinder a distance that corresponds to a vertical distance traveled by the header.

8. The container handling system of claim 7, wherein the vacuum cylinder comprises a first portion having a pressure that is lower than an atmospheric pressure and a second portion having a pressure that is at atmospheric pressure, wherein the first portion is separated from the second portion by the piston.

9. The container handling system of claim 8, wherein the vacuum cylinder is devoid of piston rod seals and the container handling system is devoid of an accumulator.

10. The container handling system of claim 5, wherein the counter balance utilizes a mass to counter gravitational force exerted on the header.

11. The container handling system of claim 5, wherein the assembly is a pulley assembly that comprises a first belt disposed at a first side of the upright frame and a second belt disposed at a second side of the upright frame, the container handling system further comprising:
a first motor coupled to the first belt and configured to move the first belt in at least one direction.

12. The container handling system of claim 11, further comprising:
a second motor coupled to the second belt and configured to move the second belt in at least one direction.

13. The container handling system of claim 12, wherein the first motor is configured to move the first belt in a first direction when the header is moving in an upwards vertical direction, the second motor is configured to move the second belt in the first direction, and the piston is configured to slide in a second direction.

14. The container handling system of claim 5, wherein the header further comprises:
an item carriage extending along a depth direction perpendicular to the lateral direction and the vertical direction;
wherein the extractor is coupled to the item carriage and configured to pull an item from an inventory holder into the item carriage.

15. The container handling system of claim 5, wherein the support assembly is a claw assembly configured to open and close, wherein the extractor is configured to pull an item over the claw assembly in a closed state, and the claw assembly is configured to open for releasing the item directly over a carrier.

16. A container handling system comprising:
a laterally movable frame moveable in a lateral direction;
an upright frame supported by the laterally movable frame; and
a header movably coupled to the upright frame and configured to move in a vertical direction, wherein the header comprises:
an extractor; and
a support assembly configured to open and close, wherein the support assembly is configured to receive an item from the extractor;
an assembly configured to drive vertical movement of the header; and
a massless counter balance coupled to the assembly, wherein the massless counter balance provides a force to counter gravitational force exerted on the header.

17. The container handling system of claim 16, wherein the massless counter balance is a vacuum cylinder comprising a piston and a cylinder, wherein the piston is configured to slide in the cylinder a distance that corresponds to a vertical distance traveled by the header.

18. The container handling system of claim 16, wherein the vacuum cylinder is devoid of piston rod seals.

19. The container handling system of claim 16, wherein the assembly is a pulley assembly that comprises a first belt disposed at a first side of the upright frame and a second belt disposed at a second side of the upright frame, the container handling system further comprising:
a first motor coupled to the first belt and configured to move the first belt in at least one direction.

20. The container handling system of claim 19, further comprising:
a second motor coupled to the second belt and configured to move the second belt in at least one direction.

* * * * *